United States Patent
Anazawa et al.

(10) Patent No.: US 10,942,121 B2
(45) Date of Patent: Mar. 9, 2021

(54) ANALYSIS DEVICE

(71) Applicant: Hitachi High-Tech Corporation, Tokyo (JP)

(72) Inventors: Takashi Anazawa, Tokyo (JP); Motohiro Yamazaki, Tokyo (JP); Taro Nakazawa, Tokyo (JP); Michiru Fujioka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/650,748

(22) PCT Filed: Aug. 29, 2018

(86) PCT No.: PCT/JP2018/031943
§ 371 (c)(1),
(2) Date: Mar. 25, 2020

(87) PCT Pub. No.: WO2019/065057
PCT Pub. Date: Apr. 4, 2019

(65) Prior Publication Data
US 2020/0271584 A1 Aug. 27, 2020

(30) Foreign Application Priority Data
Sep. 29, 2017 (JP) .............................. JP2017-191705

(51) Int. Cl.
*G01N 21/63* (2006.01)
*G01N 21/64* (2006.01)

(52) U.S. Cl.
CPC ................................ *G01N 21/6456* (2013.01)

(58) Field of Classification Search
CPC ........ G01N 27/44743; G01N 27/44782; G01N 21/6456; G01N 33/48721; G01N 27/44721; G01N 21/76; G01N 21/05; G01N 21/64
See application file for complete search history.

(56) References Cited

U.S. PATENT DOCUMENTS

| 5,694,215 A | 12/1997 | Carver |
| 5,790,727 A | 8/1998 | Dhadwal et al. |

(Continued)

FOREIGN PATENT DOCUMENTS

| JP | H09-152418 A | 6/1997 |
| JP | 2001-324472 A | 11/2001 |

(Continued)

OTHER PUBLICATIONS

International Search Report and Written Opinion for related International Application No. PCT/JP2018/031943, dated Nov. 20, 2018; English translation of ISR provided (8 pages).

*Primary Examiner* — David P Porta
*Assistant Examiner* — Mamadou Faye
(74) *Attorney, Agent, or Firm* — Procopio, Cory, Hargreaves & Savitch LLP

(57) ABSTRACT

In order to avoid crosstalk between images by a simple method, an optical system through which lights emitted from a plurality of light emission points pass, and a measurement unit that measures lights imaged by the optical system are provided, and a midpoint of two arbitrary light emission points among the light emission points is shifted away from a center of the optical system. More specifically, the center of the optical system exists outside a light emission point group consisting of the plurality of the light emission points. With the above configuration, main images and ghost images are separated each other, and thus, it is (Continued)

possible to avoid crosstalk caused by ghosting and to correctly analyze emissions from the plurality of the light emission points.

17 Claims, 28 Drawing Sheets

(56) References Cited

U.S. PATENT DOCUMENTS

| | | |
|---|---|---|
| 5,833,827 A | 11/1998 | Anazawa et al. |
| 6,686,582 B1 | 2/2004 | Völcker et al. |
| 6,690,467 B1 | 2/2004 | Reel |
| 7,054,004 B2 | 5/2006 | Inaba et al. |
| 2001/0040094 A1 | 11/2001 | Inaba et al. |
| 2002/0140934 A1 | 10/2002 | Inaba et al. |
| 2003/0226756 A1 | 12/2003 | Inaba et al. |
| 2005/0231718 A1 | 10/2005 | Goodall et al. |
| 2007/0065344 A1 | 3/2007 | Carson et al. |
| 2011/0036992 A1 | 2/2011 | Fukumoto et al. |
| 2014/0065628 A1* | 3/2014 | Van Gelder ...... G01N 27/44721 435/6.12 |
| 2014/0219871 A1 | 8/2014 | Sjolander |

FOREIGN PATENT DOCUMENTS

| | | |
|---|---|---|
| JP | 2002-514739 A | 5/2002 |
| JP | 2002-296235 A | 10/2002 |
| JP | 2003-532887 A | 11/2003 |
| JP | 2004-144479 A | 5/2004 |
| JP | 2005-514591 A | 5/2005 |
| JP | 2005-535895 A | 11/2005 |
| JP | 3897277 B2 | 3/2007 |
| JP | 2009-204451 A | 9/2009 |
| JP | 2011-059095 A | 3/2011 |
| JP | 2014-528574 A | 10/2014 |

* cited by examiner

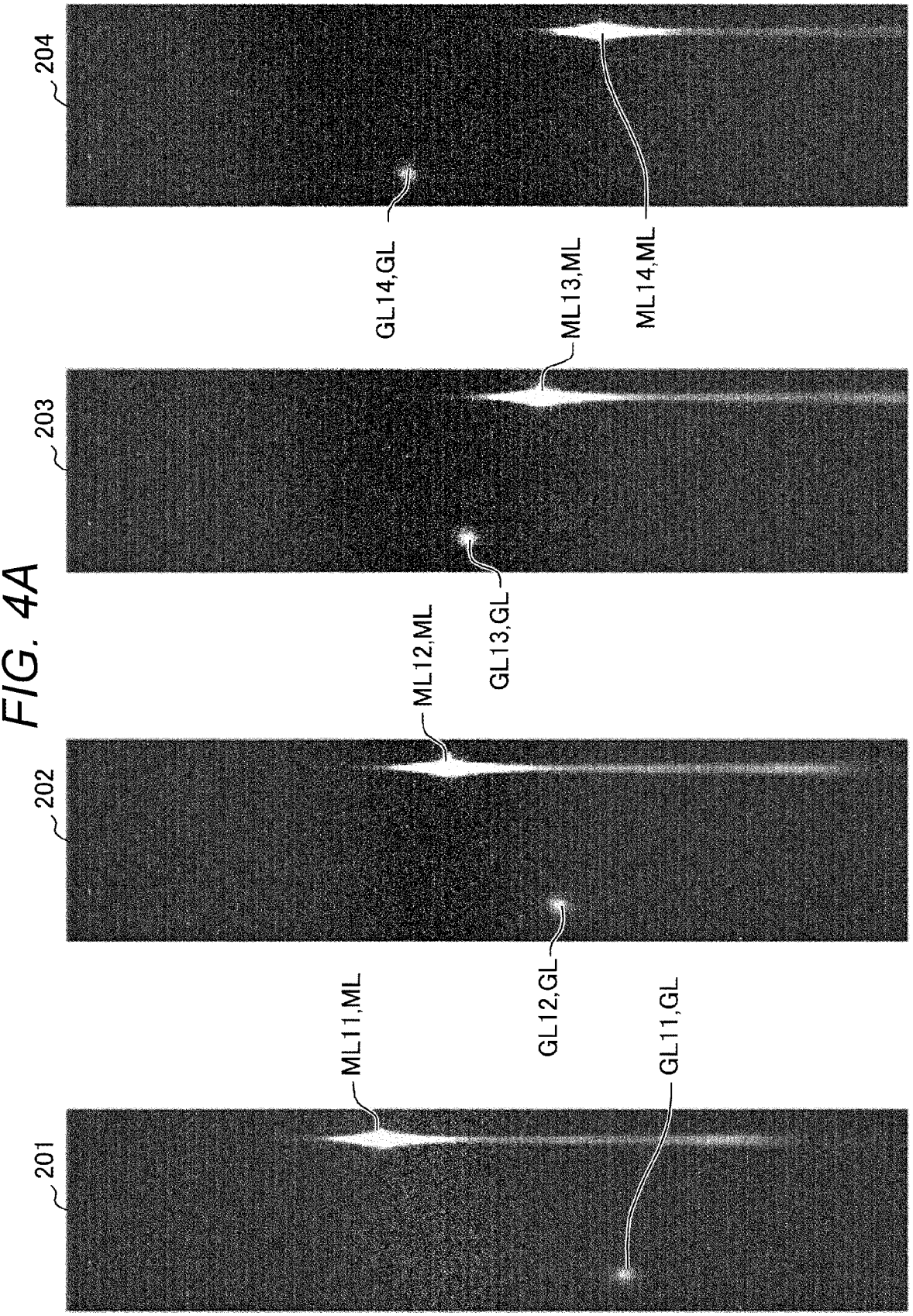

FIG. 12
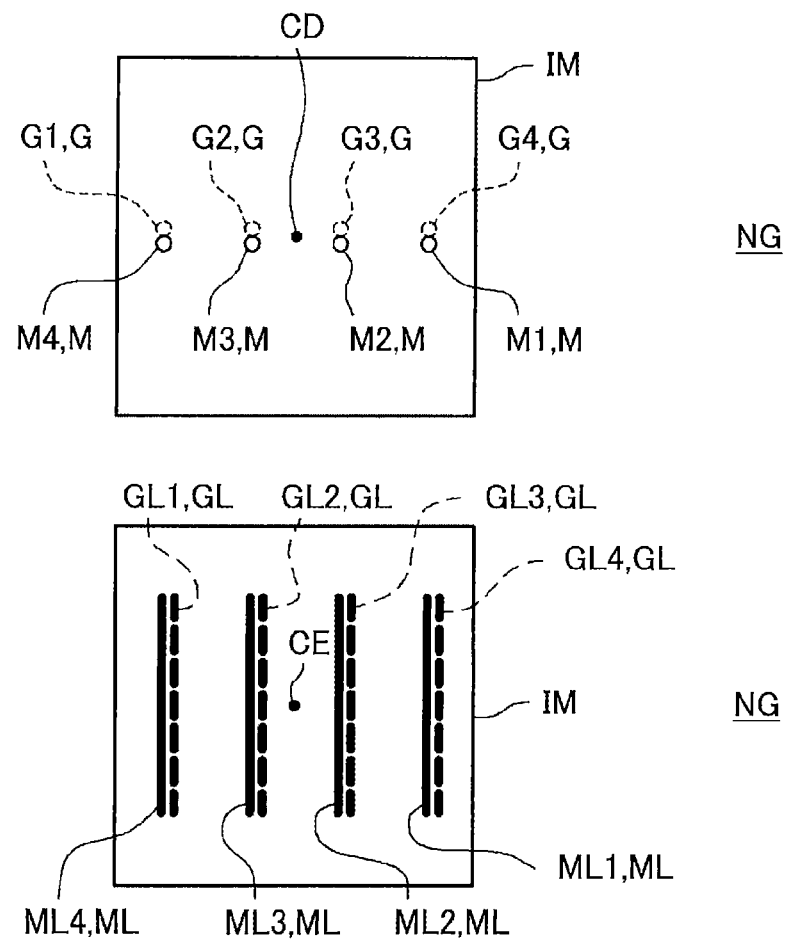
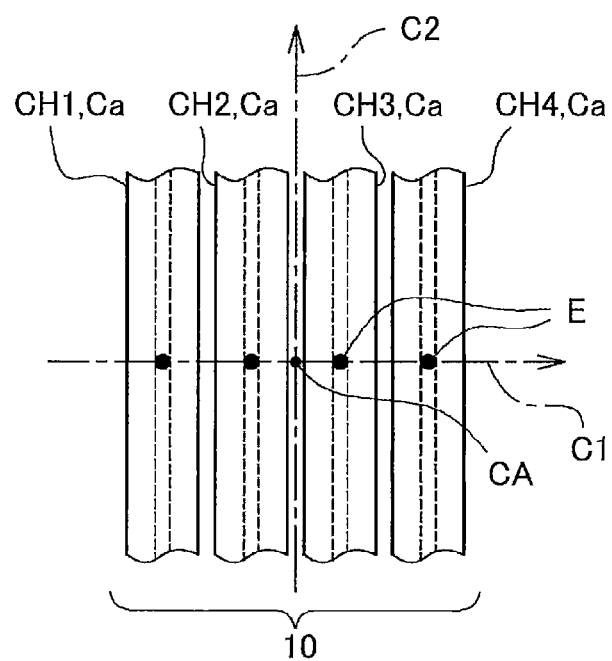

FIG. 13
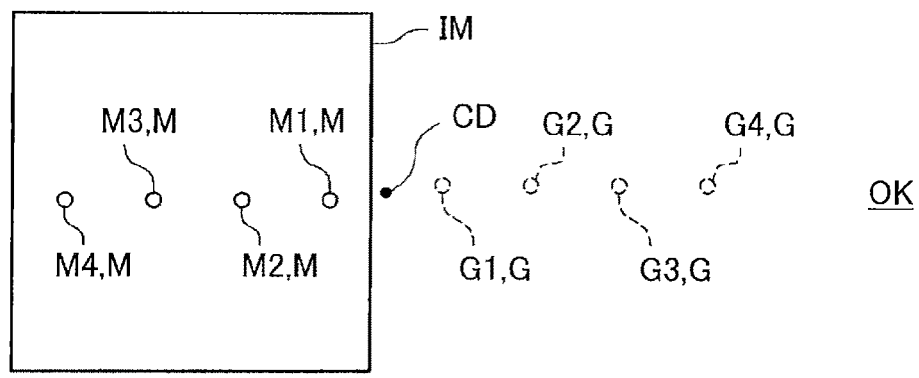
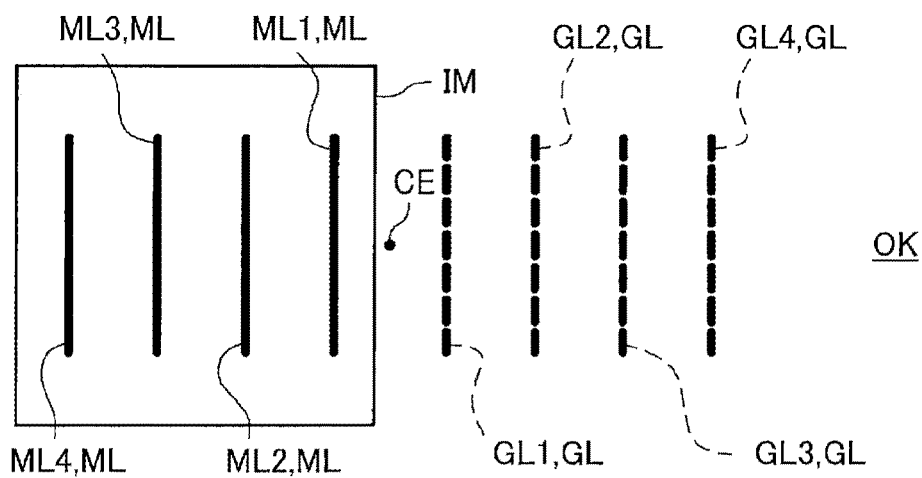
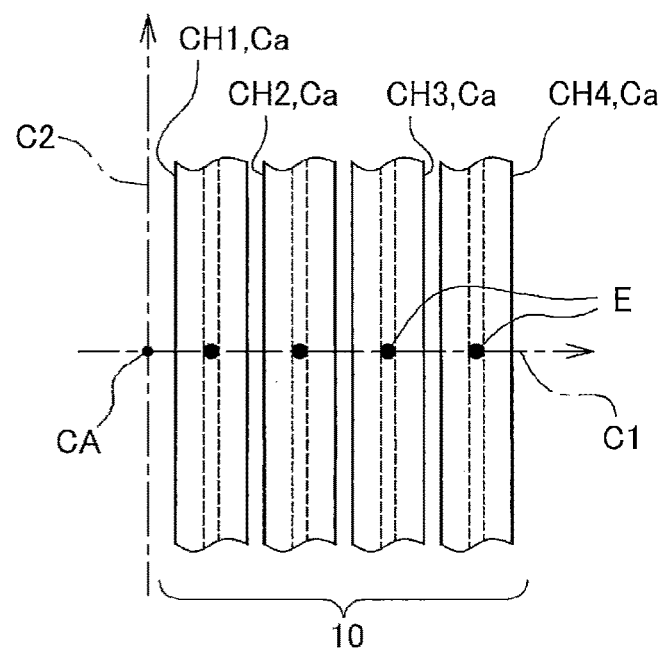

FIG. 14
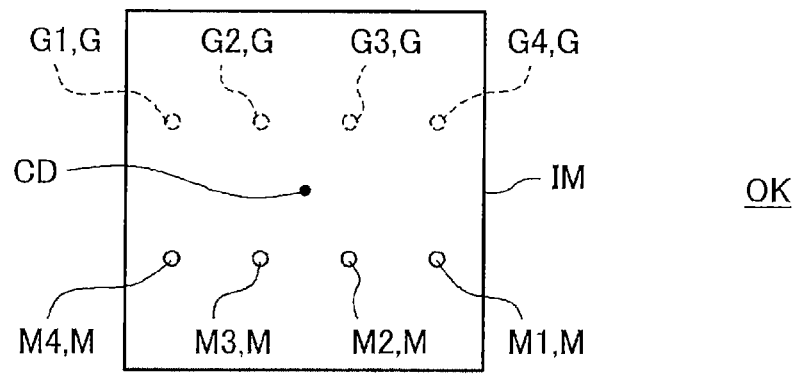
OK
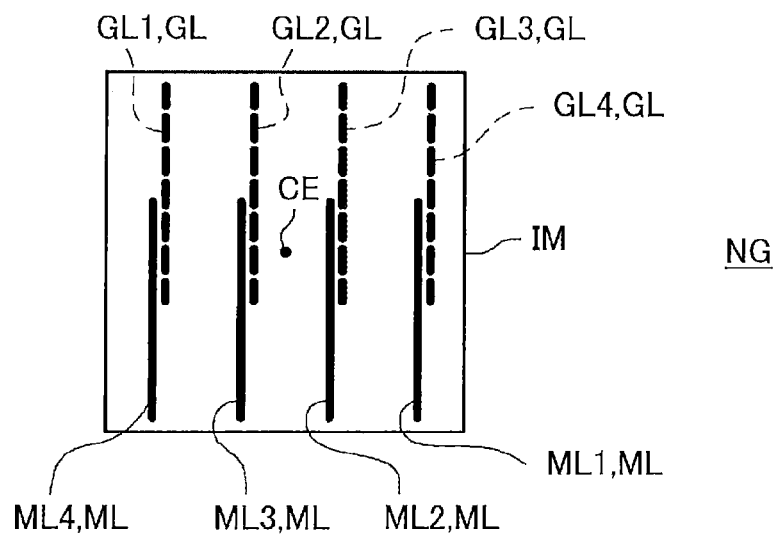
NG
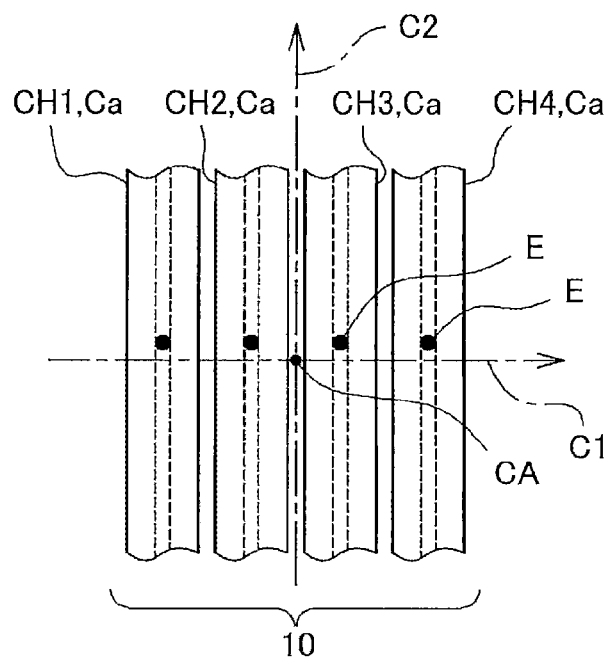

FIG. 15
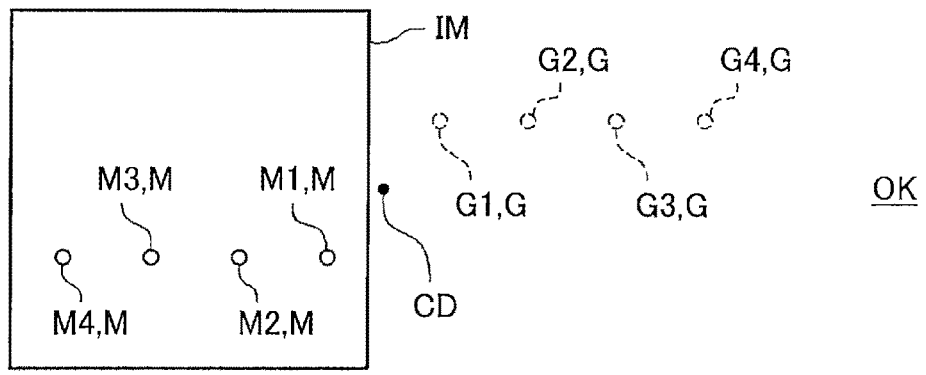
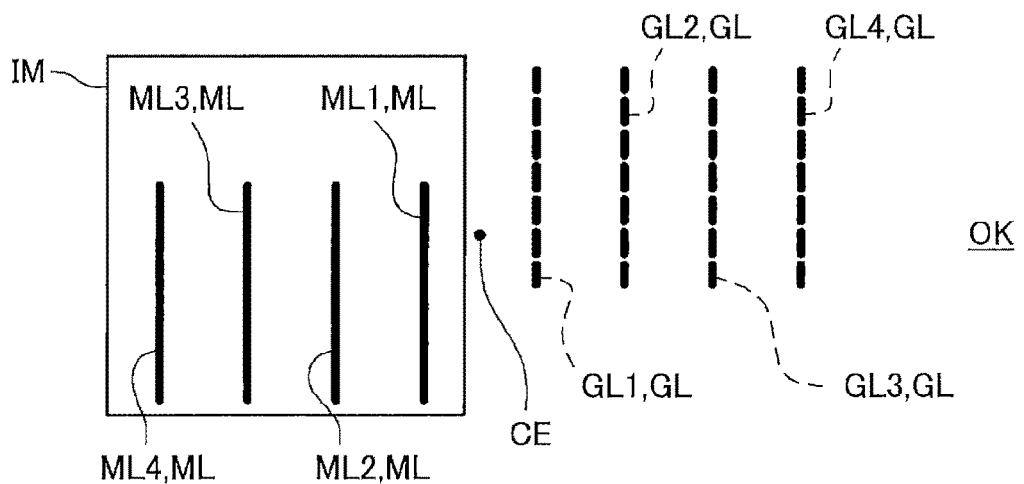
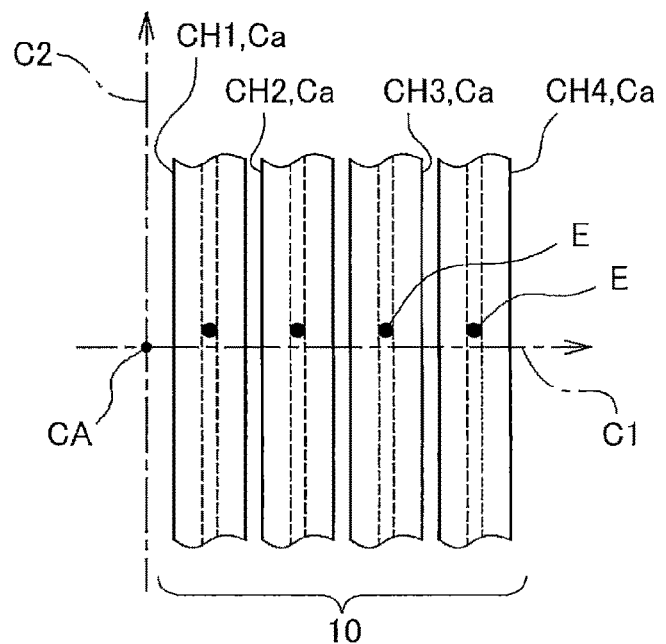

FIG. 16
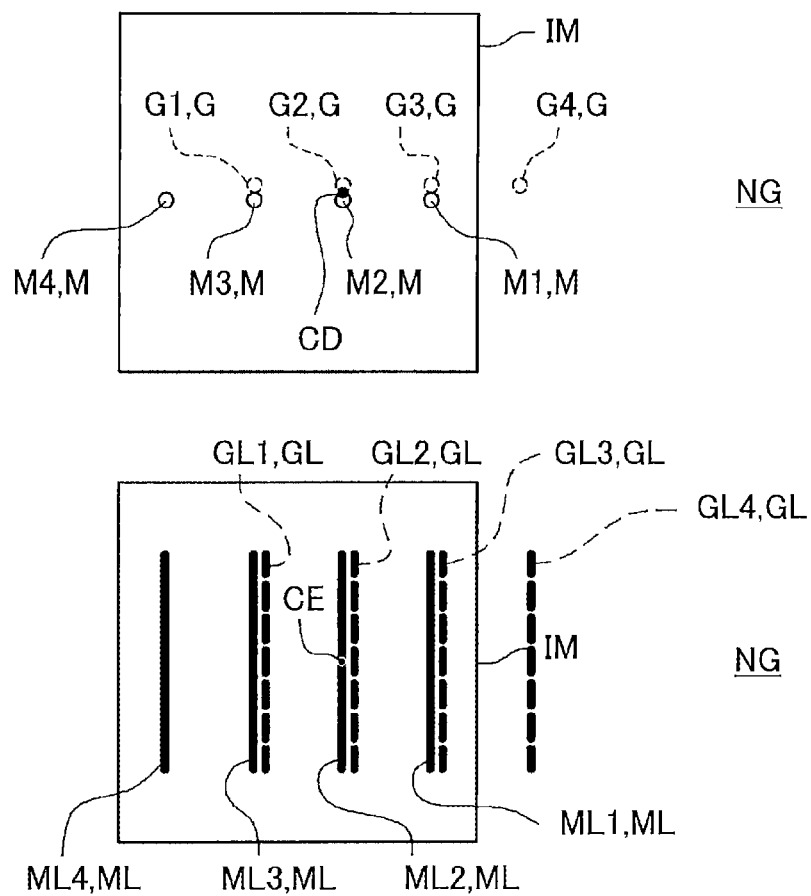
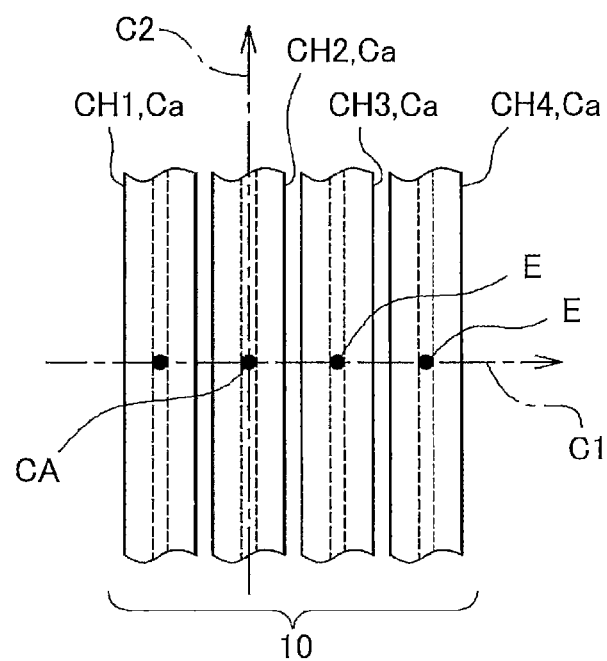

FIG. 17
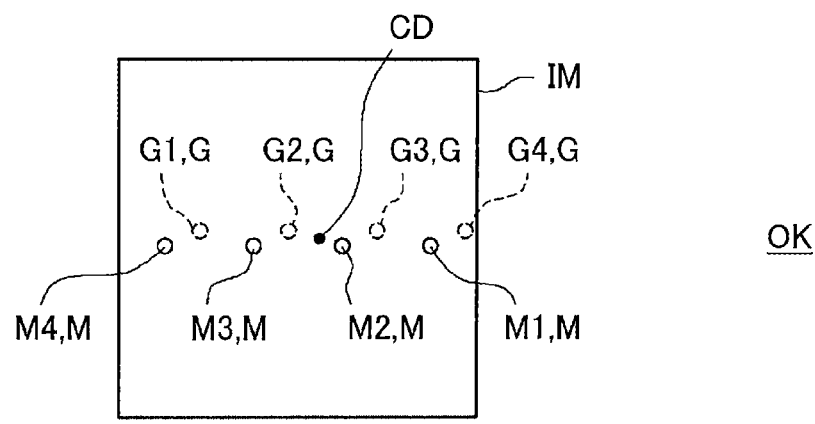
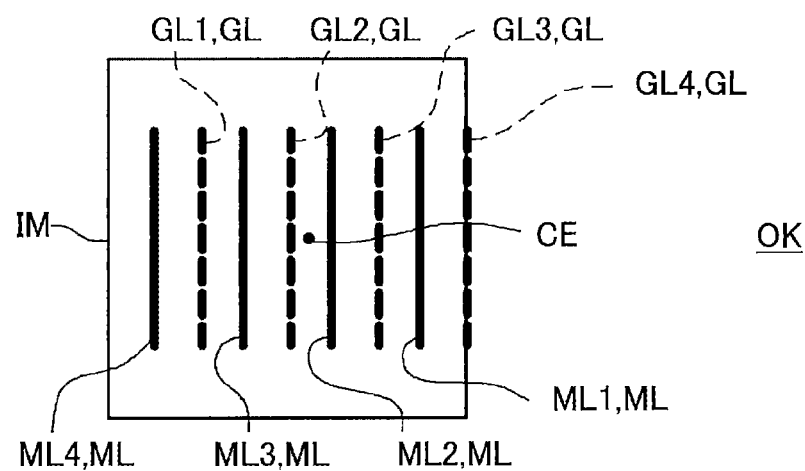
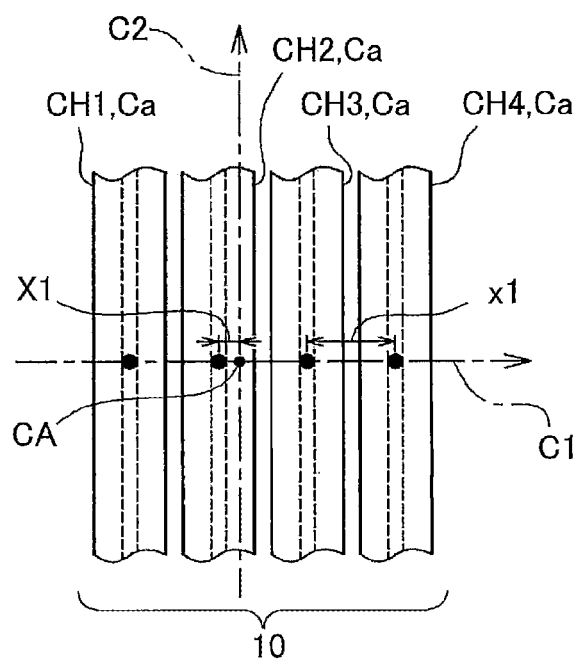

FIG. 18
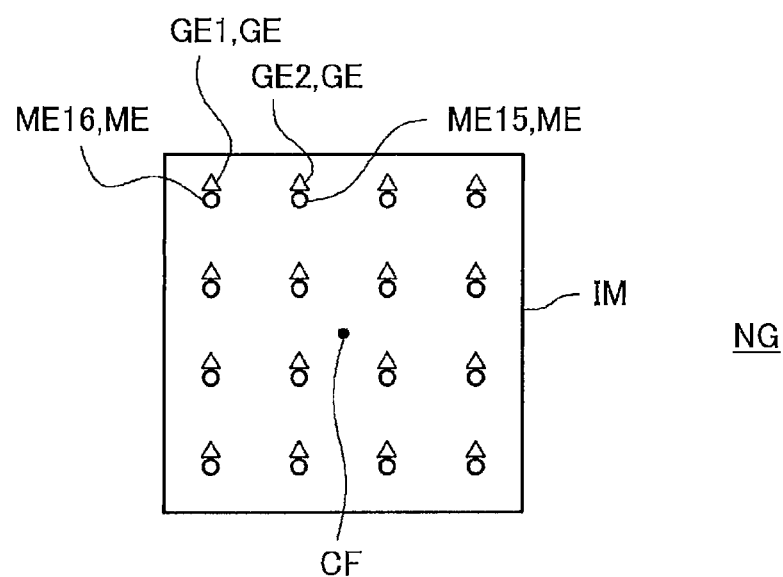
NG
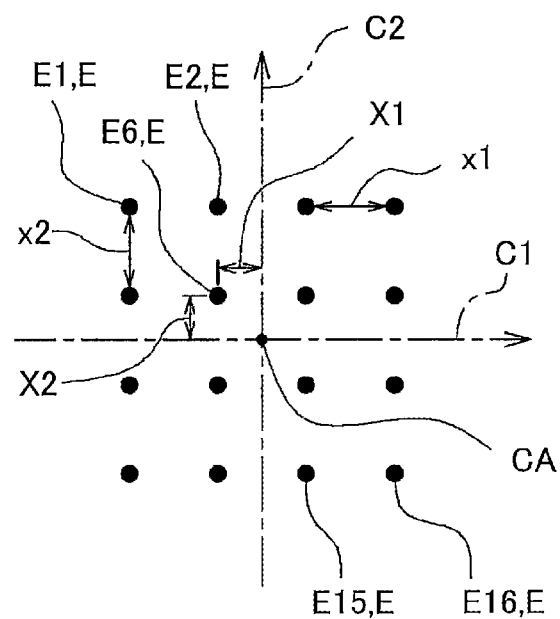

FIG. 19
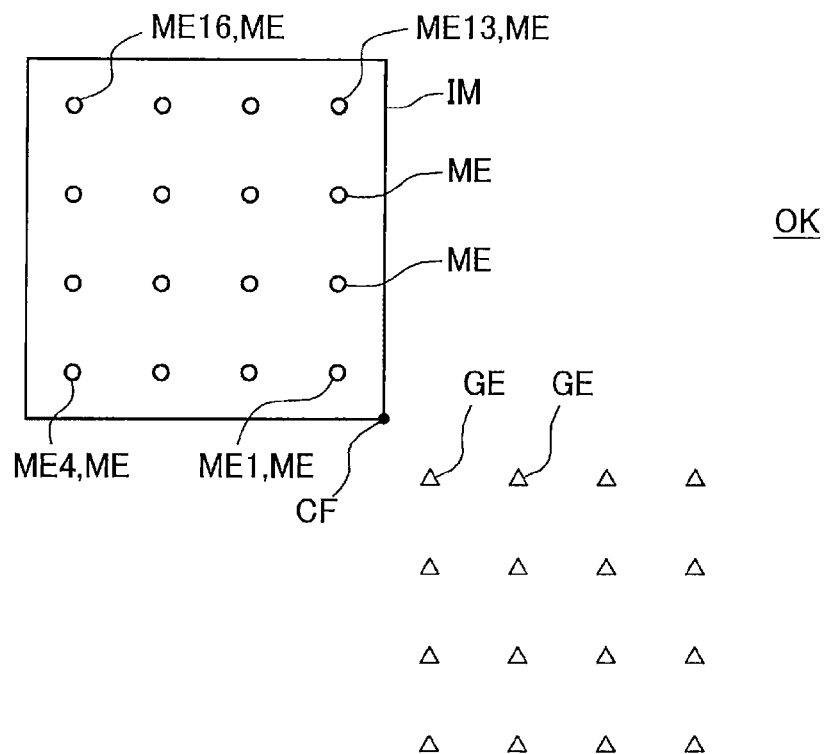
OK
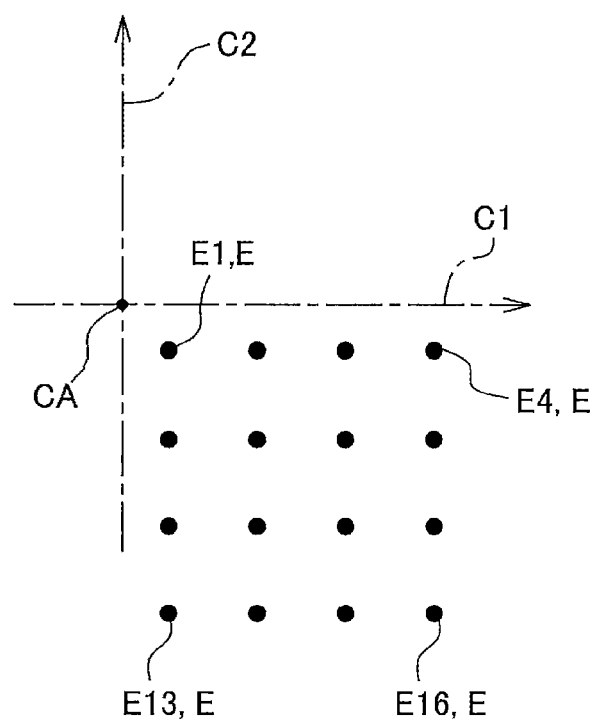

FIG. 20
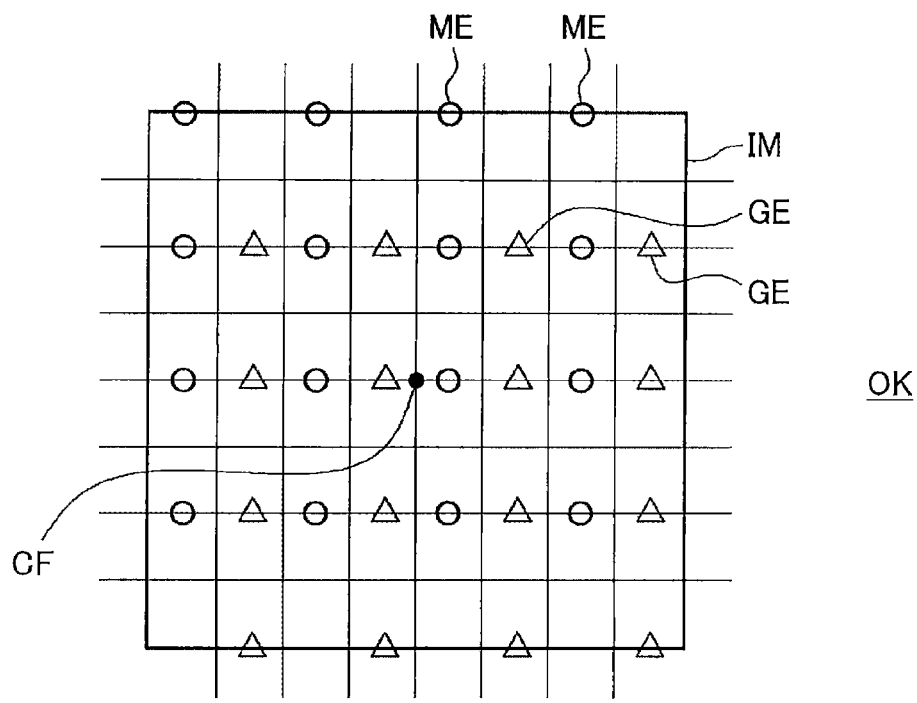
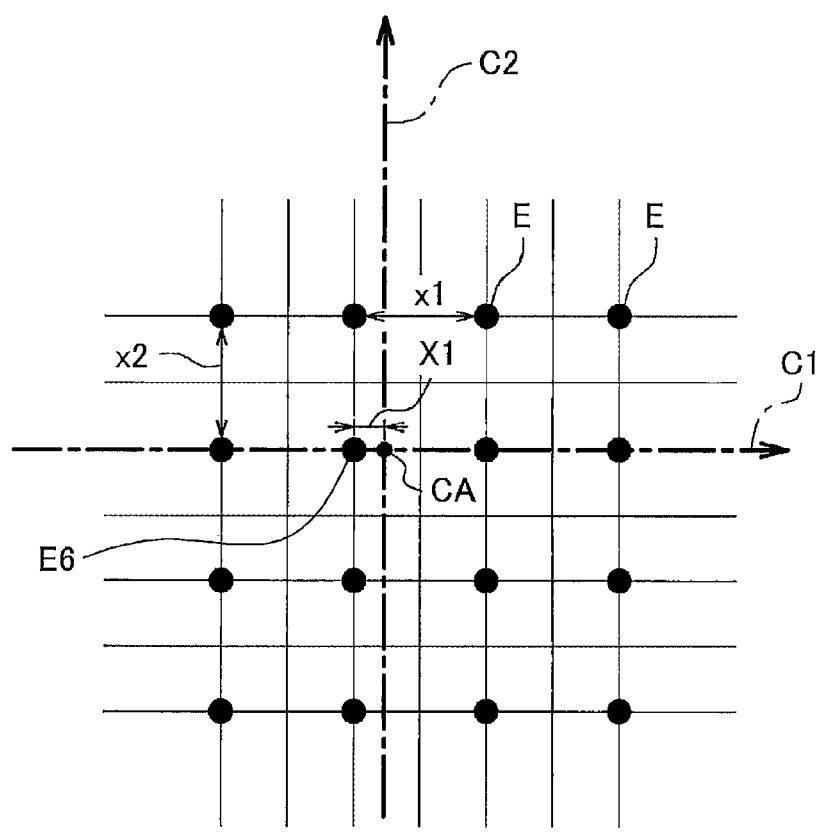

FIG. 21
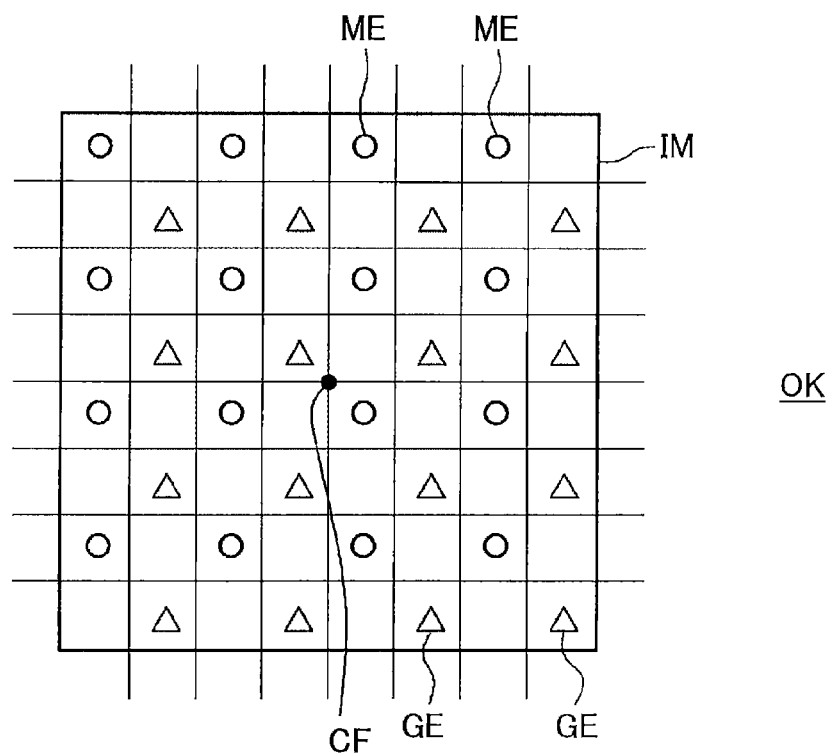
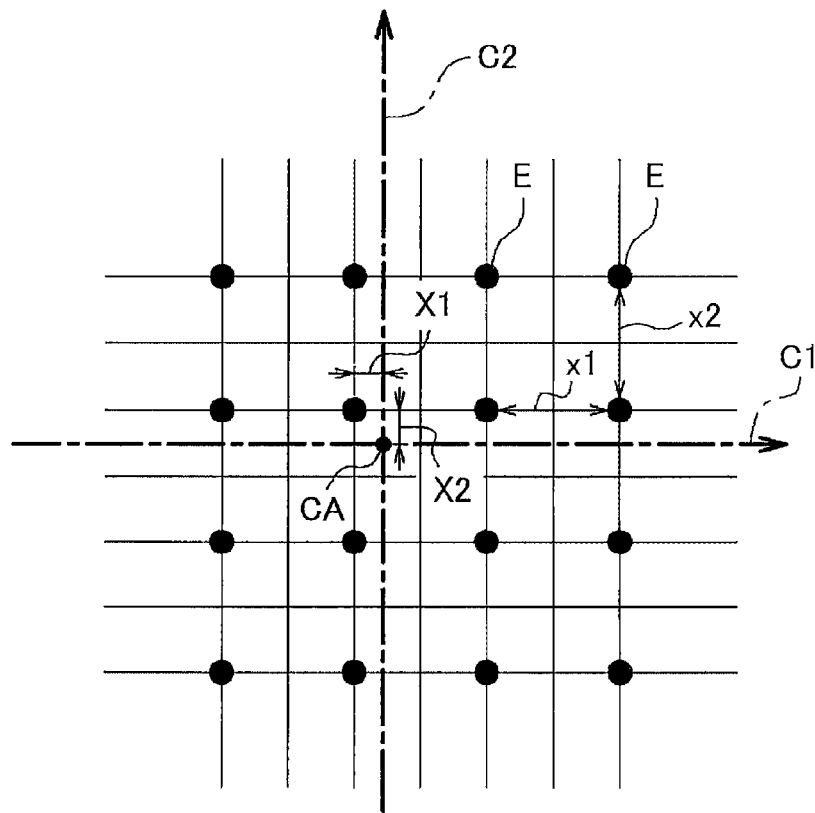

FIG. 27

|  |  | CAPILLARY FOR EVALUATING PRESENCE OR ABSENCE OF CROSSTALK | | | |
|---|---|---|---|---|---|
|  |  | CH1 | CH2 | CH3 | CH4 |
| CAPILLARY IN WHICH CONCENTRATED SAMPLE IS MIGRATED | CH1 | – | ABSENT | ABSENT | ABSENT |
|  | CH2 | ABSENT | – | ABSENT | PRESENT |
|  | CH3 | ABSENT | ABSENT | – | ABSENT |
|  | CH4 | ABSENT | PRESENT | ABSENT | – |

ANALYSIS DEVICE

CROSS-REFERENCE TO RELATED APPLICATIONS

This application is a U.S. National Stage entry of PCT Application No PCT/JP2018/031943 filed Aug. 29, 2018, which claims priority to Japanese Patent Application No. 2017-191705 filed on Sep. 29, 2017, the contents of which are incorporated herein by reference.

TECHNICAL FIELD

The present invention relates to a technique of an analysis device based on measurement of light emission from a plurality of light emission points.

BACKGROUND ART

In recent years, capillary electrophoresis devices in which capillaries are filled with an electrophoresis medium such as a polymer gel and a polymer solution have been widely used as electrophoresis devices.

For example, Patent Document 1 discloses a capillary array and a capillary array photodetector, "the capillary array including a substrate having a planar capillary holding surface and a plurality of capillaries aligned on the capillary holding surface of the substrate, wherein a laser beam irradiated on a capillary at one end or capillaries at both ends of the plurality of capillaries in a substantially parallel direction with respect to the capillary holding surface propagates to all the plurality of capillaries one by one to travel through the capillaries, and emissions from each of the capillaries are detected in a substantially perpendicular direction with respect to the capillary holding surface, wherein the substrate having the plurality of aligned capillaries is provided with a through hole extending from the capillary holding surface to a back surface in an area opposing portions of the capillaries each of which receives the laser beam irradiation, and wherein the substrate exists at the back of the capillaries when the capillary array is viewed from a photodetector"(see claim 1).

RELATED ART DOCUMENT

Patent Document

Patent Document 1: Japanese Patent No. 3897277

SUMMARY OF INVENTION

Technical Problem

As will be described later, in a capillary electrophoresis device, a capillary is irradiated with a laser beam, and an image of the emission thereof is formed on an imaging device via an optical system such as a lens. Analysis is performed using such an image. However, crosstalk to be described below occurs in the image.

FIG. 25 is an enlarged view of capillaries Ca.

Here, four capillaries Ca, which are channels 1 to 4 (CH1 to CH4) from the left side of the drawing, respectively, are provided.

FIG. 26 is a graph illustrating a change over time in signal intensity (SI) of each of the capillaries Ca when a high concentration sample is injected only into the channel 4 and migration is performed without injecting a sample into the other channels. Here, for the channels 1 to 3 the vertical scales thereof are enlarged.

Four peaks are detected in the channel 4 in which the sample has been migrated. On the other hand, only a baseline and noise are detected in the channels 1 and 3. However, peaks appear also in the channel 2 even though no sample has been flowed therein. Further, the appearance timings of the peaks of the channel 2 corresponds to those of the peaks of the channel 4. Moreover, a signal intensity of each of the peaks of the channel 2 is directly proportional to that of each of the peaks of the channel 4. That is, signals of the channel 4 partially leak into the channel 2. The signal intensity of each of the peaks of the channel 2 is lower than that of the channel 4 (for example, 0.1% to 10%). However, if the signal of the channel 4 overlaps with that of another channel even with such a low signal intensity, the analysis accuracy greatly decreases. Here, the case where the sample is not injected into the channel 2 is illustrated. However, in a case where the sample is injected into the channel 4 and a different sample is injected into the channel 2, both a normal signal of the channel 2 and a signal leaking from channel 4 may be inconveniently mixed in the channel 2.

In this manner, a phenomenon that a normal signal of a specific channel leaks into another channel and is measured as a pseudo signal of the other channel is referred to as crosstalk.

Next, the inventors have investigated conditions under which the above crosstalk occurs.

FIG. 27 is a table showing that crosstalk has occurred in which capillary Ca, when a sample is caused to flow in a specific capillary Ca (see FIG. 25).

In the table illustrated in FIG. 27, a column direction indicates a channel of the capillary Ca in which a high concentration sample is migrated, and a row direction indicates a channel of the capillary Ca for evaluating the presence or absence of crosstalk.

In the case illustrated in FIG. 27, when a sample is caused to flow in the channel 2 (CH2), crosstalk occurs in the channel 4 (CH4) ("present").

Conversely, when a sample is caused to flow in the channel 4, crosstalk occurs in the channel 2 ("present").

On the other hand, no crosstalk occurs in other combinations of the channels ("absent").

Although crosstalk occurs between the channel 2 and the channel 4 and no crosstalk occurs in the other combinations in the case illustrated in FIG. 27, the following cases are also observed.

Crosstalk occurs in the channel 3 (CH3) when a sample is caused to flow in the channel 1 (CH1), and crosstalk occurs in the channel 1 when a sample is caused to flow in the channel 3.

Crosstalk occurs in the channel 4 (CH4) when a sample is caused to flow in the channel 1 (CH1), and crosstalk occurs in the channel 1 when a sample is caused to flow in the channel 4.

Crosstalk occurs in the channel 3 (CH3) when a sample is caused to flow in the channel 2 (CH2), and crosstalk occurs in the channel 2 when a sample is caused to flow in the channel 3.

In any case, no crosstalk is observed except for the above combination of capillaries Ca in which crosstalk is observed.

In this manner, it has been found that crosstalk occurs in a specific combination of capillaries Ca and no crosstalk occurs in the other combinations of capillaries Ca. Further, it has been found that there is a case where a color change (color shift) occurs in a site where the crosstalk occurs in the case of performing wavelength dispersive analysis.

In this manner, the inventors have found that large crosstalk occurs between specific capillaries Ca. However, causes thereof are unknown. Crosstalk not only inhibits independent analysis of different samples using different capillaries Ca but also reduces the sensitivity and dynamic range in the analysis, and thus, must be avoided.

The present invention has been made in view of such a background, and an object of the present invention is to avoid crosstalk in images by a simple method.

Solution to Problem

In order to solve the above-described problem, the present invention is characterized by including a plurality of light emission points, an optical system that forms images of light emitted from the light emission points, and a measurement unit that measures the imaged light, a midpoint of any two light emission points among the light emission points being shifted from an optical axis of the optical system.

Other solutions will be described later in an embodiment.

Advantageous Effects of Invention

According to the present invention, crosstalk in images can be avoided by the simple method.

BRIEF DESCRIPTION OF DRAWINGS

FIG. 4A illustrates actual crosstalk images (Part 1).

FIG. 12 illustrates an NG (which means "no good" hereinafter) arrangement example of a capillary array 10 and an optical system P both for point images and wavelength-dispersion images.

FIG. 13 illustrates an OK (which means "good" hereinafter) arrangement example (Part 1) of a capillary array 10 and an optical system P both for point images and wavelength-dispersion images.

FIG. 14 illustrates an arrangement example, which is OK for point images but NG for wavelength-dispersion images, of a capillary array 10 and an optical system P.

FIG. 15 illustrates an OK arrangement example (Part 2) of a capillary array 10 and an optical system P both for point images and wavelength-dispersion images.

FIG. 16 illustrates an NG arrangement example of a capillary array 10 and an optical system P both for point images and wavelength-dispersion images.

FIG. 17 illustrates an OK arrangement example (Part 3) of a capillary array 10 and an optical system P both for point images and wavelength-dispersion images.

FIG. 18 illustrates an NG arrangement example of a microarray.

FIG. 19 illustrates an OK arrangement example (Part 1) of a microarray.

FIG. 20 illustrates an OK arrangement example (Part 2) of a microarray.

FIG. 21 illustrates an OK arrangement example (Part 3) of a microarray.

FIG. 27 is a table showing that crosstalk has occurred in which capillary Ca, when a sample is caused to flow in a specific capillary Ca.

DESCRIPTION OF EMBODIMENTS

Next, a mode for carrying out the present invention (referred to as an "embodiment") will be described in detail with reference to the drawings as appropriate.

[Capillary Electrophoresis Device W]

Figure 1:
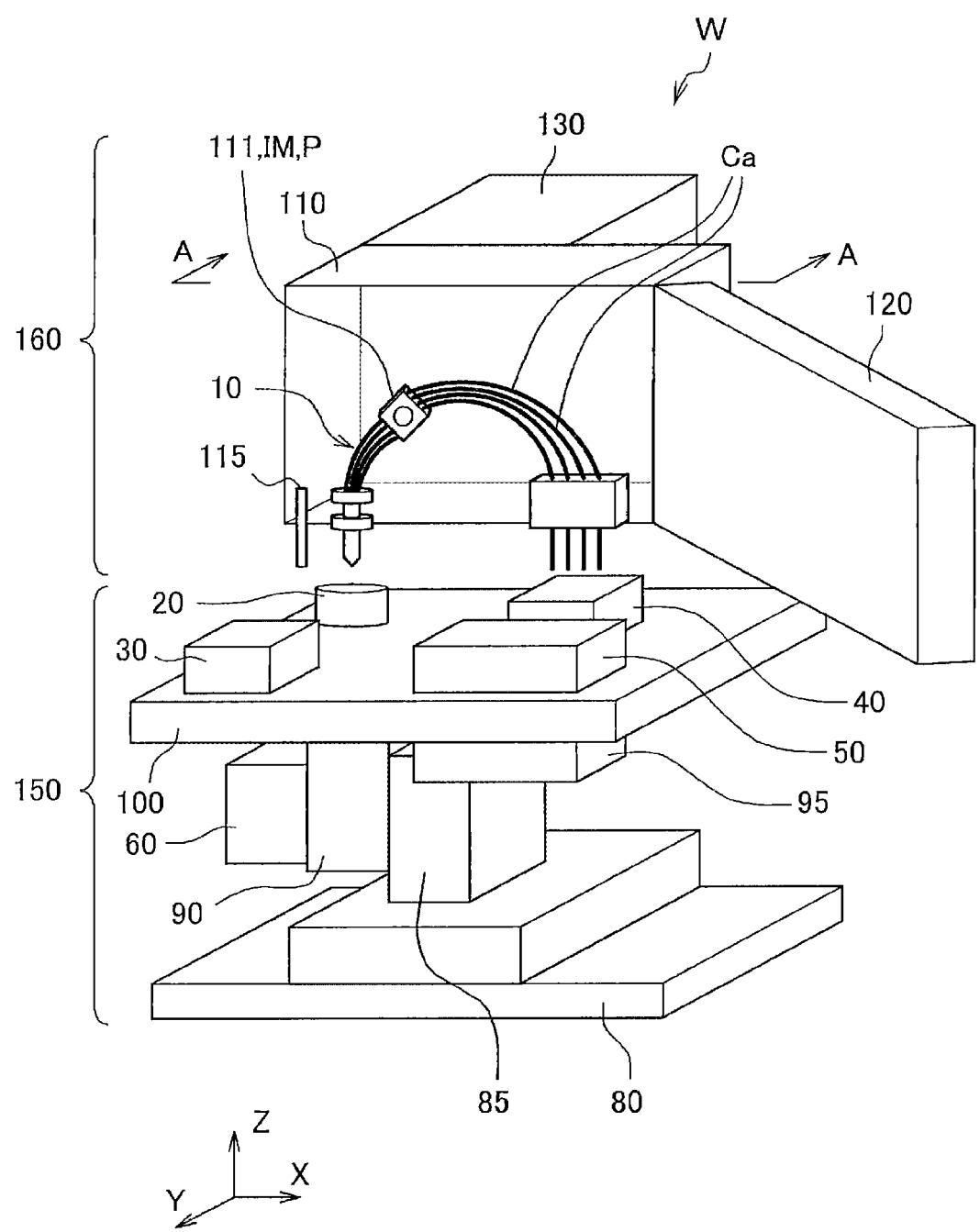
FIG. 1 is a configuration view of a capillary electrophoresis device W according to the present embodiment.

FIG. 1 is a configuration view of a capillary electrophoresis device (analysis device) W according to the present embodiment.

This device can be divided into two major units: an autosampler unit 150 constituting a lower part of the device; and an irradiation detection/thermostatic bath unit 160 constituting an upper part of the device.

The autosampler unit 150 is provided with a Y-axis drive body 85 on a sampler base 80. The Y-axis drive body 85 drives a sample tray 100 in the Y-axis direction. The Y-axis drive body 85 is provided with a Z-axis drive body 90. The Z-axis drive body 90 drives the sample tray 100 in the Z-axis direction. The sample tray 100 is mounted on the Z-axis drive body 90. A user sets the electrophoresis medium container 20, an anode side buffer liquid container 30, a cathode side buffer liquid container 40, and a sample container 50 on the sample tray 100. The sample container 50 is set on an X-axis drive body 95 installed below the sample tray 100. The Z-axis drive body 90 is also provided with a liquid feeding mechanism 60. The liquid feeding mechanism 60 is arranged below the electrophoresis medium container 20.

The irradiation detection/thermostatic bath unit 160 includes a thermostatic bath unit 110 and a thermostatic bath door 120. When the thermostatic bath door 120 is closed, the thermostatic bath unit 110 can be maintained at a constant temperature. A measurement unit 130 is mounted behind the thermostatic bath unit 110 and can perform detection during electrophoresis. The user sets a capillary array 10 in the thermostatic bath unit 110 and performs electrophoresis while keeping the capillary array 10 at a constant temperature in the thermostatic bath unit 110. Thereafter, the detection is performed by the measurement unit 130. Further, the thermostatic bath unit 110 is also provided with an electrode 115 configured to drop to GND when a high voltage for electrophoresis is applied. The capillary array 10 is constituted by the plurality of (four in the example of FIG. 1) capillaries Ca.

In this manner, the capillary array 10 is fixed inside a bath of the thermostatic bath unit 110. The electrophoresis medium container 20, the anode side buffer liquid container 30, the cathode side buffer liquid container 40, and the sample container 50 are driven in the Y-axis and Z-axis directions by the autosampler unit 150. Only the sample container 50 is driven in the X-axis direction. Any of the electrophoresis medium container 20, the anode side buffer liquid container 30, the cathode side buffer liquid container 40, and the sample container 50 can be automatically connected to the fixed capillary array 10 by movement of the autosampler unit 150.

A measured part 111, an imaging element IM, and an optical system P, the latter two of which are included in the measurement unit 130, will be described later.

Figure 2:
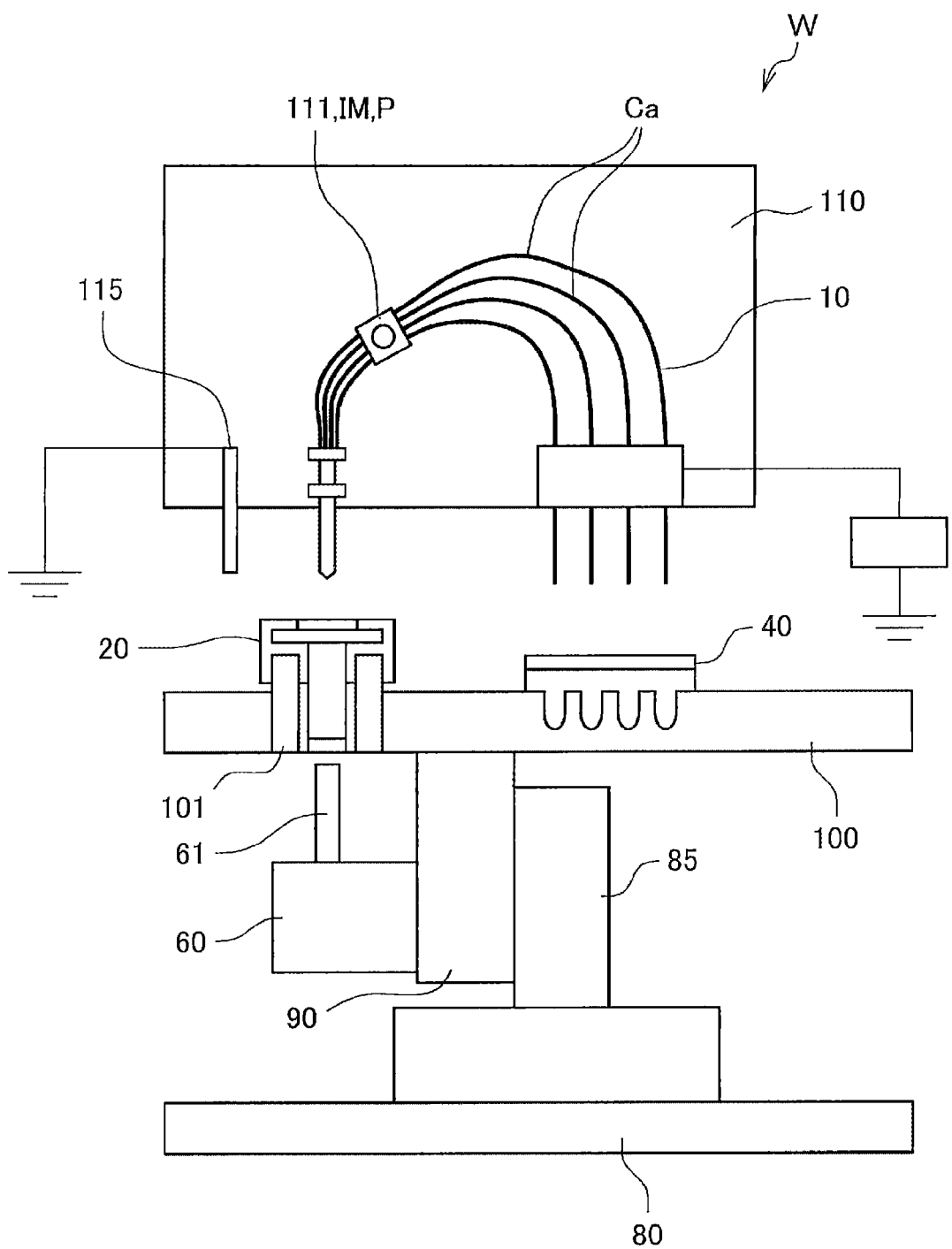
FIG. 2 is a cross-sectional view taken along a line A-A in FIG. 1.

FIG. 2 is a cross-sectional view taken along a line A-A in FIG. 1. In FIG. 2, the same configurations as those in FIG. 1 will be denoted by the same reference signs, and the description thereof can be omitted.

The electrophoresis medium container 20 is set by being inserted into a guide 101 embedded in the sample tray 100. Further, the liquid feeding mechanism 60 is arranged such that a plunger 61 provided in the liquid feeding mechanism 60 is located below the electrophoresis medium container 20.

At the time of electrophoresis, a high voltage is applied across the cathode sides of the capillary array 10 via the cathode side buffer liquid in the cathode side buffer liquid container 40 and the anode sides of the capillary array 10 via the anode side buffer liquid in the anode side buffer liquid container 30. Here, the anode side buffer liquid is grounded through the electrode 115.

The measurement unit 130 irradiates the measured part 111 of the capillary array 10 with a laser beam. Then, the measurement unit 130 detects an emission from a light emission point generated in each capillary Ca. The detected emission is analyzed in an analysis unit (not illustrated). Incidentally, the measurement unit 130 includes the imaging element IM and the optical system P consisting of a lens or the like to form an image of light emitted from each of the light emission points. The imaging element IM and the optical system P will be described later with reference to FIGS. 10A and 10B, and the like.

[Crosstalk]

Here, crosstalk will be described again in detail.

Figure 3:
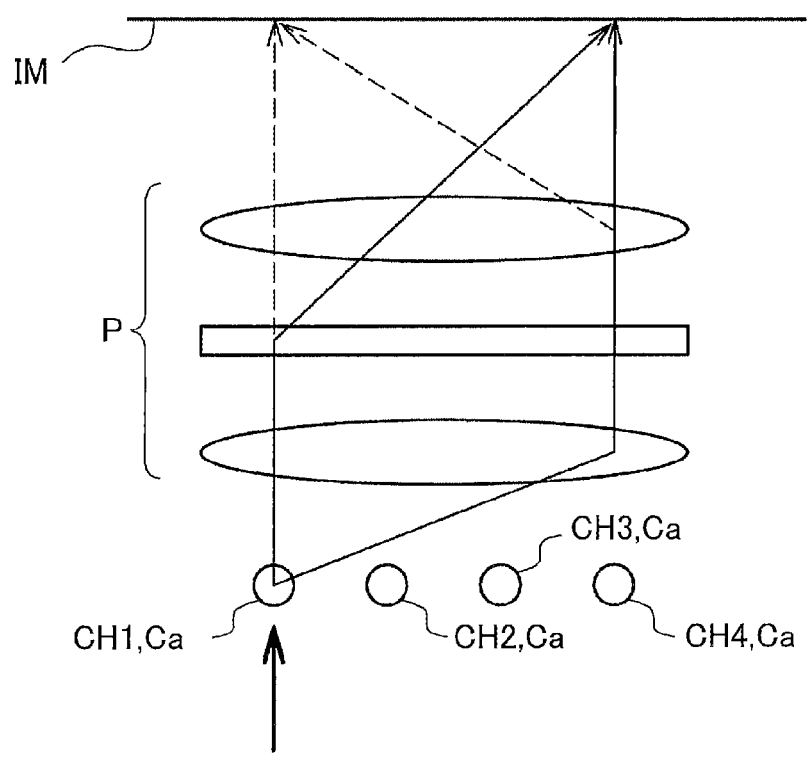
FIG. 3 is a view for describing experimental equipment configured to investigate a cause of crosstalk.

FIG. 3 is a view illustrating an experimental equipment configured to investigate causes of crosstalk. Crosstalk occurs due to various causes. For example, it is well known that a signal generated in a specific channel (for example, channel 2) leaks into adjacent channels (for example, channel 1 and channel 3) due to blur of the optical system P and crosstalk occurs in the adjacent channels. However, the crosstalk illustrated in FIG. 27 has a different characteristic. That is, the signal generated in the specific channel (for example, channel 2) leaks into the other channel that is not adjacent (for example, channel 4), and the crosstalk occurs in the channel. Therefore, the cause of the crosstalk illustrated in FIG. 27 is searched in the present embodiment. FIG. 3 illustrates the view of the experimental equipment viewed from an axial direction of the capillary Ca.

First, in order to find the cause of crosstalk, the inventors placed a pinhole provided on a shielding plate at the position of the light emission point of the channel 1 (CH1) in FIG. 3, instead of a capillary Ca. Further, this pinhole was illuminated with monochromatic light from the side opposite to the optical system P (from the lower side in FIG. 3) (indicated by a thick arrow in FIG. 3) so as to use the pinhole as a light emission point of the monochromatic light. At other channels, no light emission point was positioned (no pinhole was positioned). An emission from the pinhole simulates light emitted from the sample electrophoresed in the channel 1.

The emission from the pinhole, that is, at the position of the channel 1 is normally imaged on the imaging element IM (a normal image is formed) by the optical system P through a thin solid line path in FIG. 3. However, a part of the emission passes through a thin dashed line path in the optical system P and is abnormally imaged on the imaging element IM (an abnormal or a ghost image is formed) at a position different from a position of the normal image. As a result, so-called ghosting occurs. Such ghosting is considered as the cause of crosstalk.

Figure 4B:
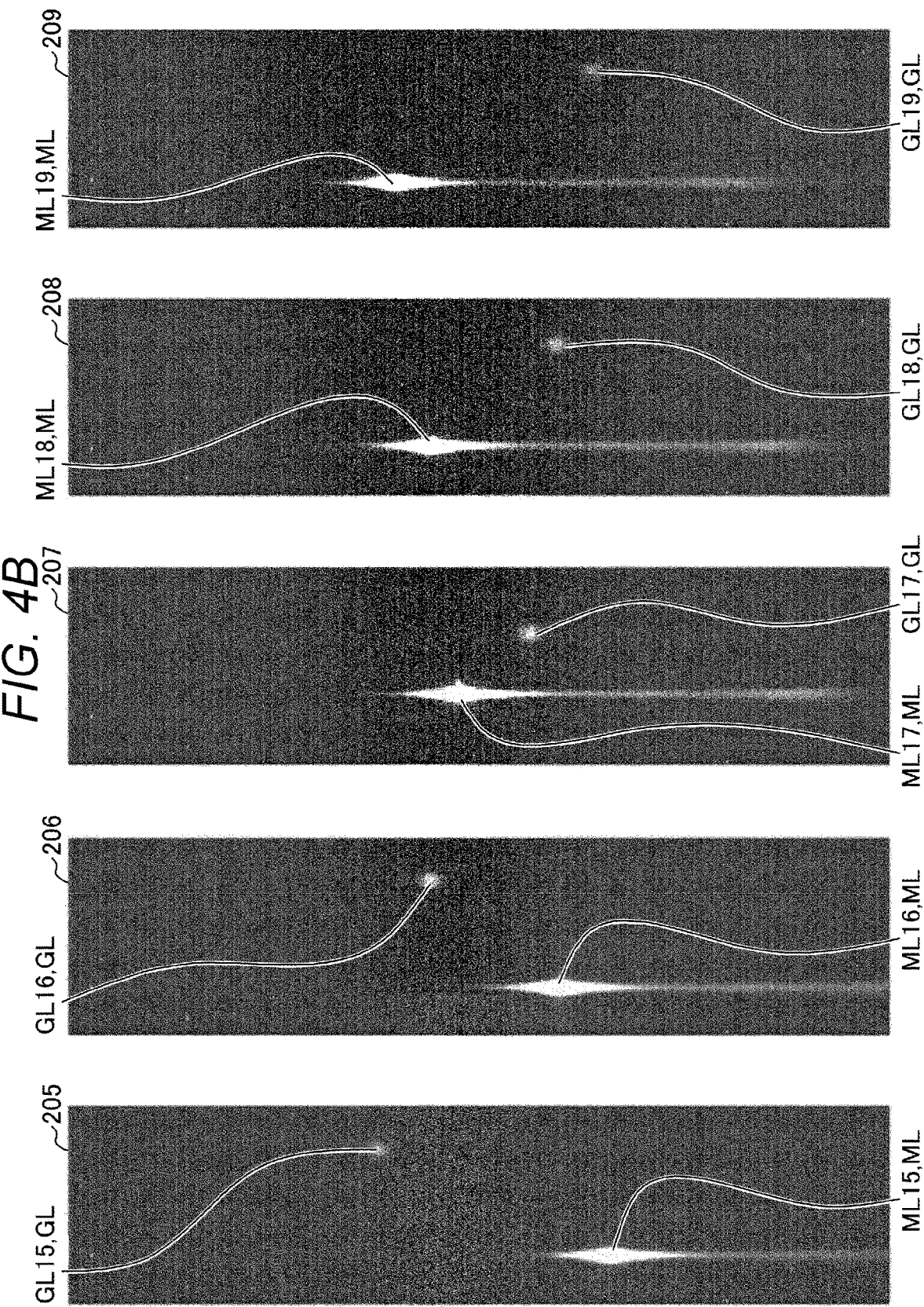
FIG. 4B illustrates actual crosstalk images (Part 2).

FIGS. 4A and 4B illustrate results of imaging by the imaging element IM using the method illustrated in FIG. 3. Incidentally, FIGS. 1 and 2 will be appropriately referred to in the following description.

FIGS. 4A and 4B are actual images each illustrating both a normal image (a main wavelength-dispersion image ML) of a light emission point and a ghost image (a ghost wavelength-dispersion image GL). Incidentally, FIGS. 4A and 4B illustrate wavelength-dispersion images of emission from the pinhole, and the vertical direction indicates wavelength.

In FIG. 4A, images 201 to 204 are the wavelength-dispersion images of emissions when the position of the pinhole is moved in the axial direction of the capillary Ca.

In FIG. 4A, main wavelength-dispersion images ML11 to ML14 are normal wavelength-dispersion images (main wavelength-dispersion images ML) of light emitted from the pinhole. On the contrary, ghost wavelength-dispersion images GL11 to GL14 are pseudo wavelength-dispersion images (ghost wavelength-dispersion images GL) of light emitted from the pinhole with respect to the main wavelength-dispersion images ML11 to ML14, respectively. It has been found that crosstalk between the capillaries Ca is caused by the generation of such ghost wavelength-dispersion images GL.

As illustrated in FIG. 4A, it is understood that positions of the ghost wavelength-dispersion images GL11 to GL14 move upward in this order, as those of the main wavelength-dispersion images ML11 to ML14 move downward in this order.

FIG. 4B illustrates results when the pinhole is placed at the position of the light emission point of the channel 4 (CH4) in FIG. 3. In FIG. 4B, images 205 to 209 are the wavelength-dispersion images of emissions when the position of the pinhole is moved in the axial direction of the capillary Ca.

In FIG. 4B, main wavelength-dispersion images ML15 to ML19 are normal wavelength-dispersion images (main wavelength-dispersion images ML) of light emitted from the pinhole. On the contrary, ghost wavelength-dispersion images GL15 to GL19 are pseudo wavelength-dispersion images (ghost wavelength-dispersion images GL) of light emitted from the pinhole with respect to the main wavelength-dispersion images ML15 to ML19, respectively.

In FIG. 4B, as in the case of FIG. 4A, it is understood that positions of the ghost wavelength-dispersion images GL15 to GL19 move downward in this order, as those of the main wavelength-dispersion images ML15 to ML19 move upward in this order.

Figure 5:
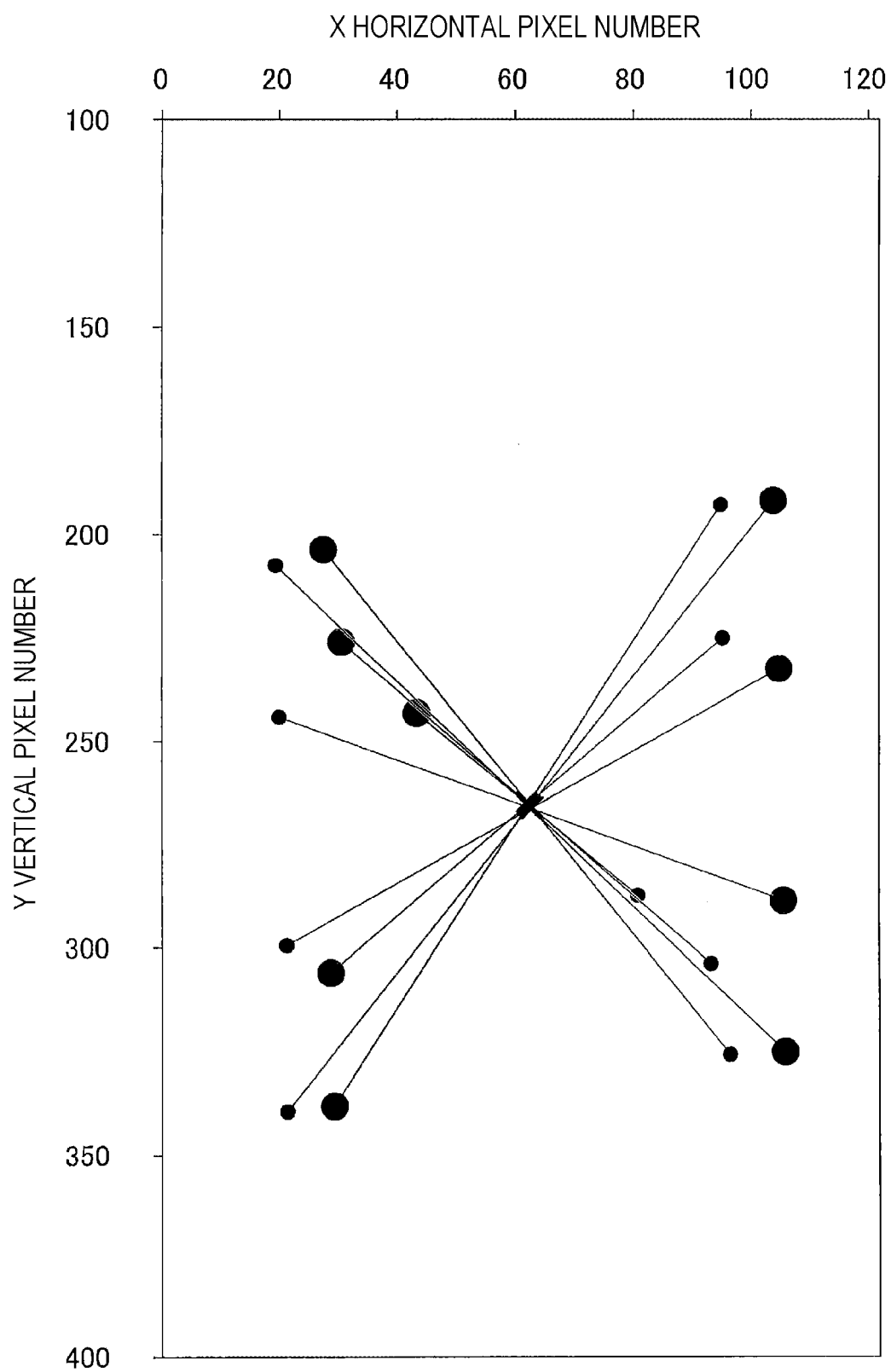
FIG. 5 is a graph illustrating positional relationships between main images and ghost images.

FIG. 5 is a graph illustrating positional relationships between main images and corresponding ghost images. The main images and the ghost images include wavelength-dispersion images and simple (not wavelength-dispersion) images, as illustrated in FIGS. 4A and 4B.

FIG. 5 illustrates an area of captured images. In FIG. 5, the vertical axis indicates a Y vertical pixel number, and the horizontal axis indicates a X horizontal pixel number. That is, the vertical axis in FIG. 5 corresponds to vertical pixels of the images 201 to 209 in FIGS. 4A and 4B, and the horizontal axis in FIG. 5 corresponds to horizontal pixels in the images 201 to 209 in FIGS. 4A and 4B. FIG. 5 illustrates superimposed results obtained by conducting experiments under a number of conditions including those of FIGS. 4A and 4B.

Large black circles in FIG. 5 indicate positions of the main images, and small black circles indicate positions of the ghost images. Since the main images are spreading, the positions of the main images are centroids thereof. The centroids are the sum of light intensity (pixel value)× coordinate.

Besides, each X mark indicates a midpoint of a line connecting a position of any main image and a position of the corresponding ghost image.

As illustrated in FIG. 5, positions of the respective midpoints are approximately the same. This means that the positions of the main images and the positions of the corresponding ghost images have a point-symmetry relationship. Moreover, the inventors have revealed that the midpoints (X marks) correspond to an optical axis of the optical system P (see FIG. 3), more specifically, an intersection between the optical axis and an imaging plane.

Therefore, it is considered that a ghost image is generated at a point-symmetry position of the main image with respect to the center of the optical system P due to multiple reflection in the optical system P.

Further, the inventors have found that all phenomena concerning crosstalk can be explained with such a consideration.

Figure 25:
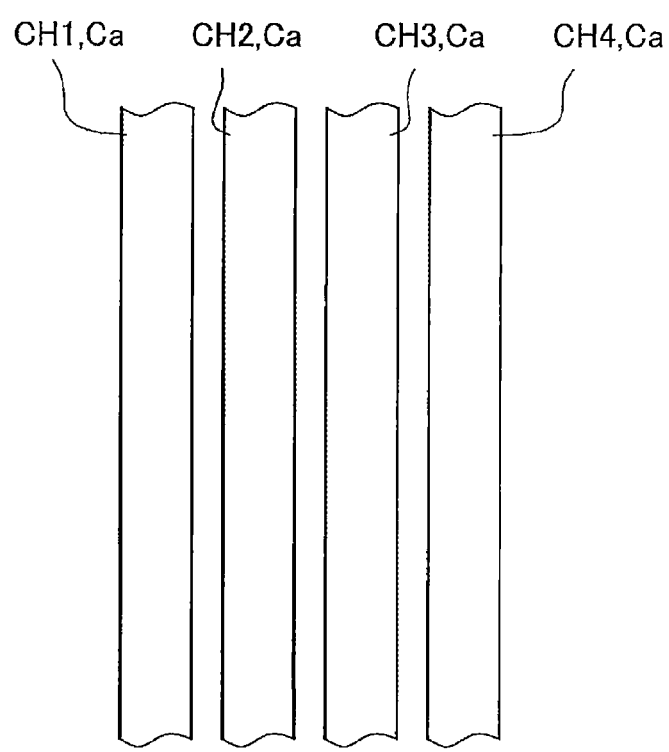
FIG. 25 is an enlarged view of capillaries Ca.

For example, when capillaries Ca are arranged as illustrated in FIG. 25 and the channel 3 (CH3) is present at the center of the optical system P (see FIG. 3), crosstalk occurs between the channel 2 (CH2) and the channel 4 (CH4). Or, when the channel 2 (CH2) is present at the center of the optical system P, crosstalk occurs between the channel 1 (CH1) and the channel 3 (CH3). Or, when an exact midpoint between the channel 2 (CH2) and the channel 3 (CH3) is present at the center of the optical system P, crosstalk occurs between the channel (CH1) and the channel 4 (CH4), and crosstalk also occurs between the channel 2 (CH2) and the channel 3 (CH3).

Further, when straight lines connecting light emission points in the plurality of capillaries Ca deviate from the center of the optical system P, ghost images are arranged obliquely with respect to a direction in which main images are arranged. Therefore, color shift in which a wavelength of a main image and a wavelength of the corresponding ghost image appear are different occurs in wavelength-dispersion images.

On the other hand, it has been found that such a phenomenon is pronounced by enhancement of ghost images because of reduction in size and cost of the optical system P.

Based on these results, the inventors have conceived to shift a position of a capillary array 10 from a center of an optical system P.

Figure 6:
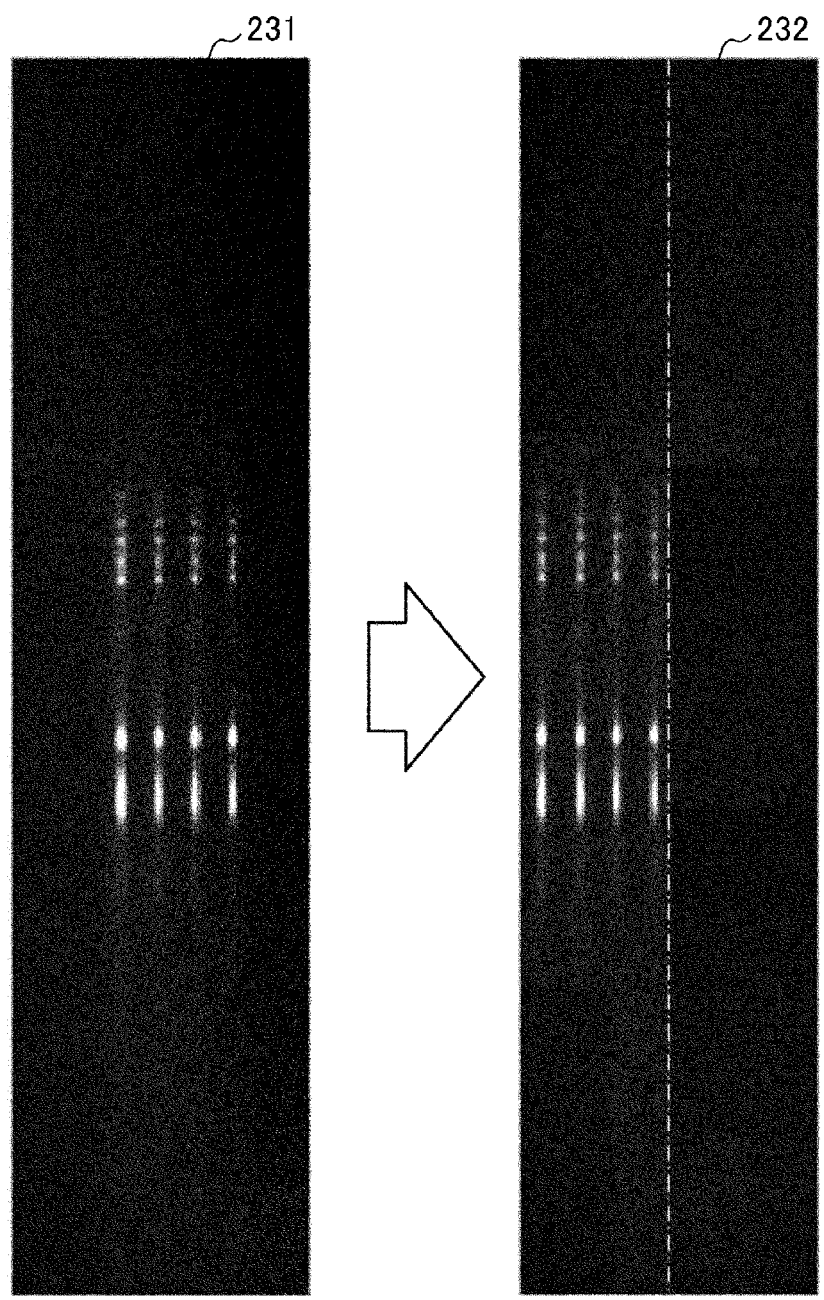
FIG. 6 is an example of images (Part 1) in which a position of a capillary array 10 is shifted from a center of an optical system P.
Figure 7:
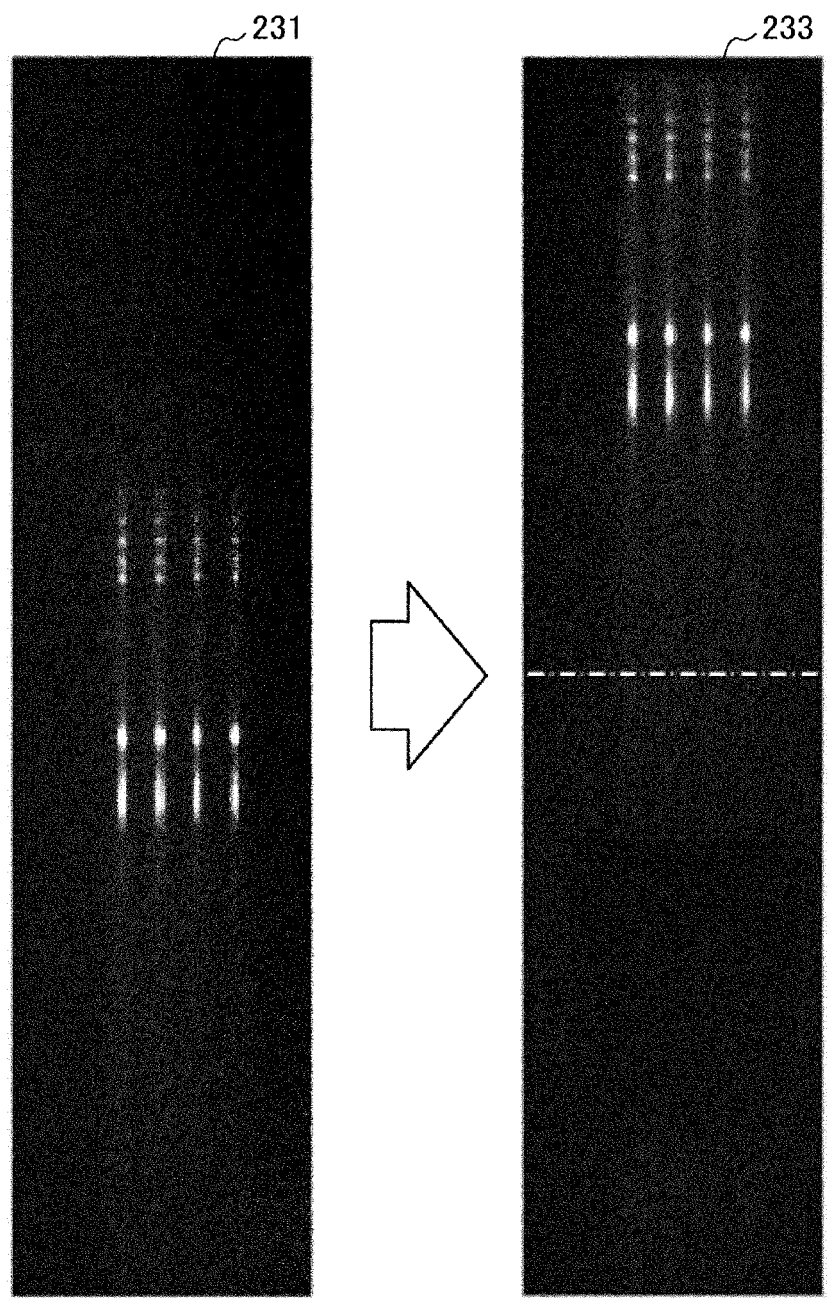
FIG. 7 is an example of images (Part 2) in which a position of a capillary array 10 is shifted from a center of an optical system P.
Figure 11A:
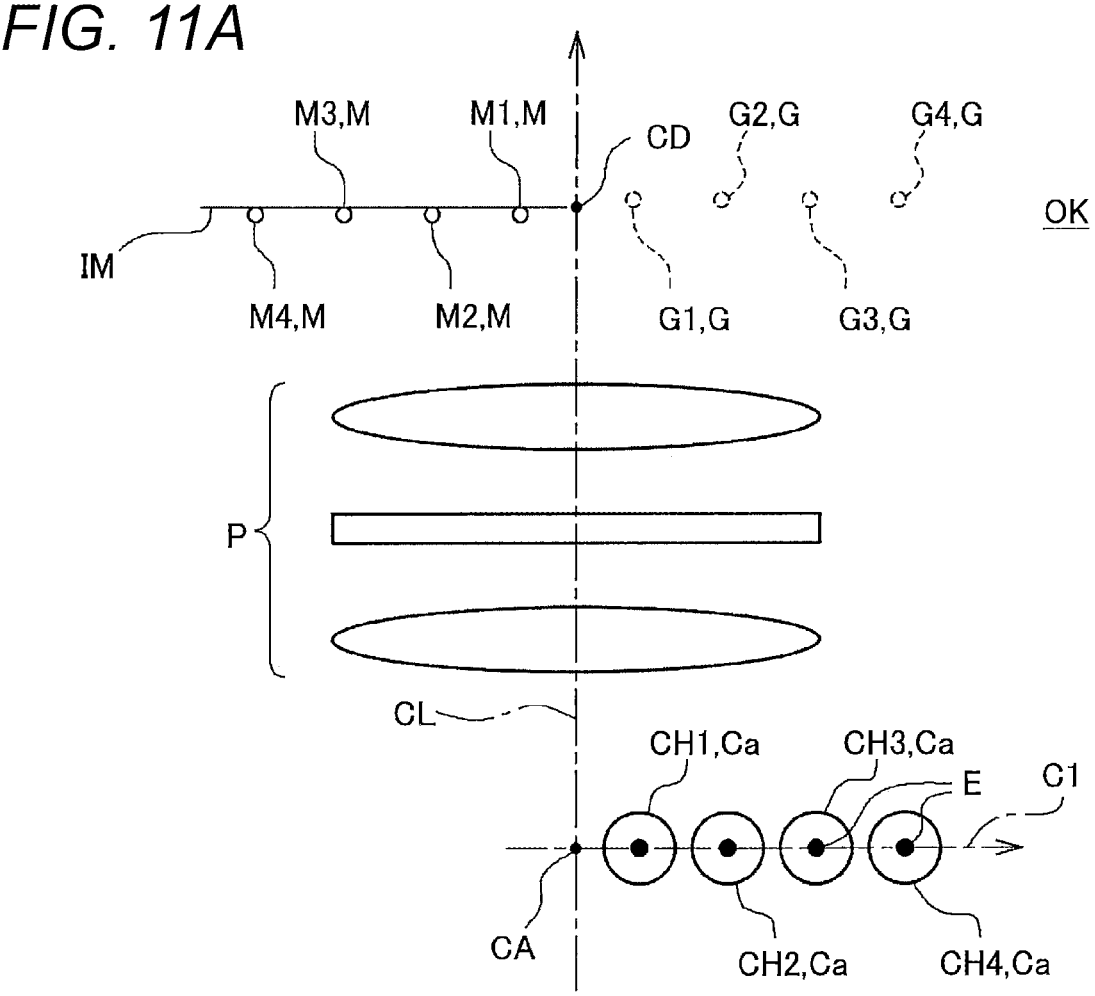
FIG. 11A illustrates an OK example (which means "an example with good results" hereinafter) of an arrangement of an optical system P and a capillary array 10 and is viewed from perpendicular direction to an axis of the optical system P.
Figure 11B:
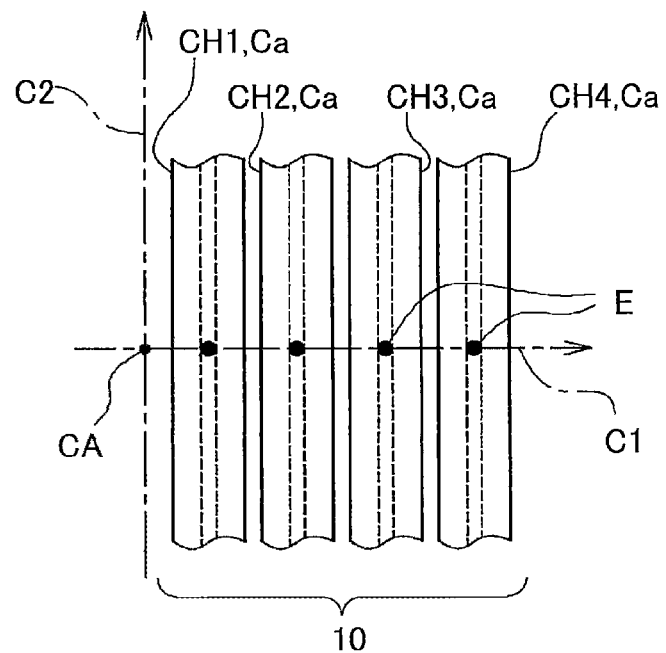
FIG. 11B illustrates the OK example in FIG. 11A and is viewed from parallel direction to the axis of the optical system P.

Each of FIGS. 6 and 7 illustrates a configuration example in which all light emission points of four capillaries Ca, that is, all laser beam irradiation positions of the capillaries Ca are shifted away from a center of an optical system P as illustrated in FIGS. 11A and 11B as an example. Incidentally, FIGS. 6 to 9 each illustrate wavelength-dispersion images of Raman scattering lights by laser beam irradiation of solutions contained in the respective capillaries Ca, and the vertical direction in FIGS. 6 to 9 indicates wavelength.

In FIG. 6, an image 231 illustrates an image before the shift of the position of the capillary array 10 (the center of the capillary array 10 substantially coincides with the center of the optical system P), and an image 232 illustrates an image after the shift by which the image of the capillary array 10 is moved leftward away from the center of the optical system P (a dash-dot line indicates a straight line in the vertical direction passing through the center of the optical system P).

In the same way, the image 231 in FIG. 7 is the same as the image 231 in FIG. 6 and illustrates an image before the shift of the position of the capillary array 10. On the contrary, an image 233 illustrates an image after the shift by which the image of the capillary array 10 is moved upward away from the center of the optical system P (a dash-dot line indicates a straight line in the horizontal direction passing through the center of the optical system P).

As illustrated in FIGS. 6 and 7, the inventors have proposed to arrange the capillary array 10 such that the image of the capillary array 10 is shifted in the left-right direction and/or the up-down direction with respect to the center of the optical system P.

Figure 8:
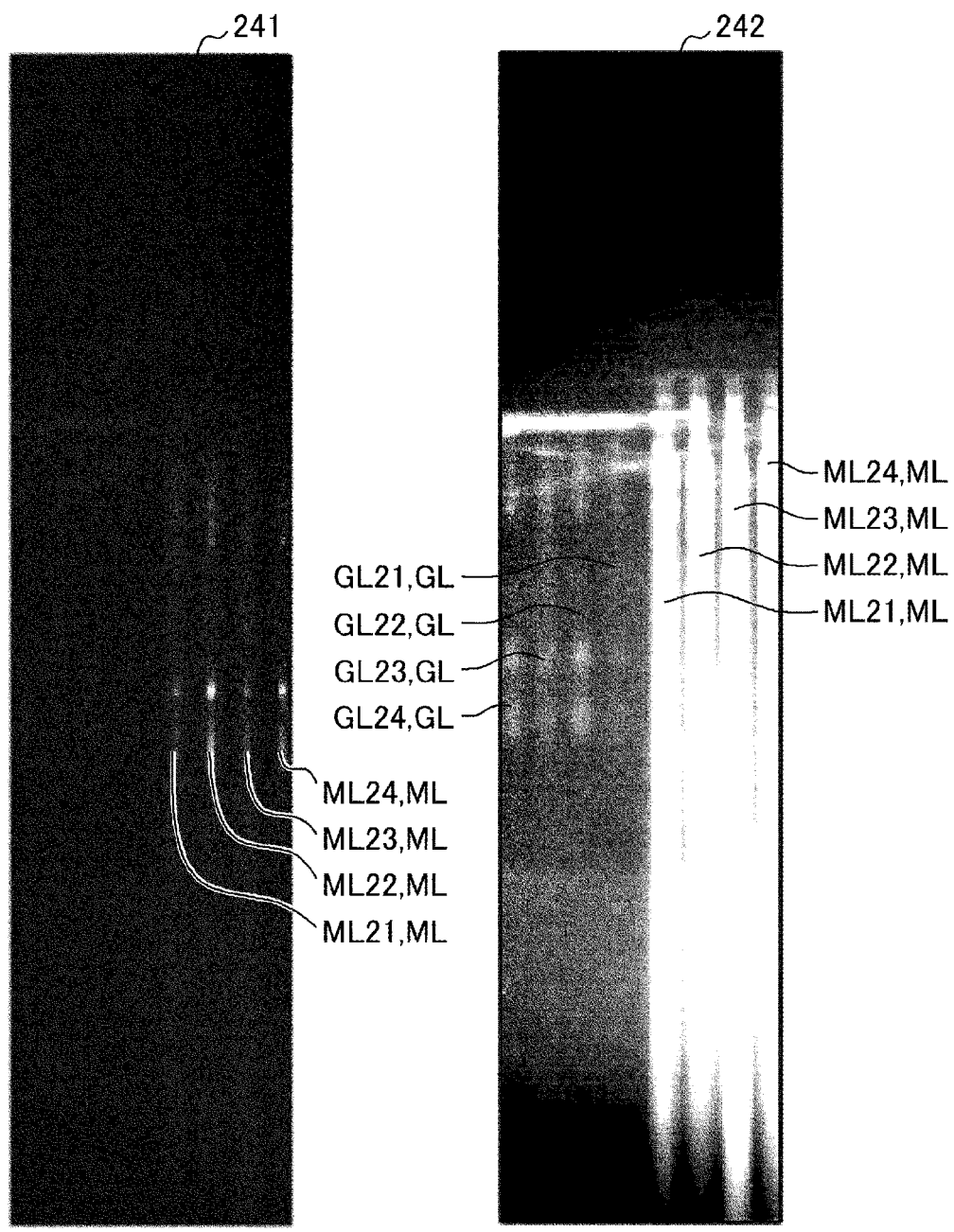
FIG. 8 illustrates images of Raman scattering from four capillaries Ca filled with water.
Figure 9:
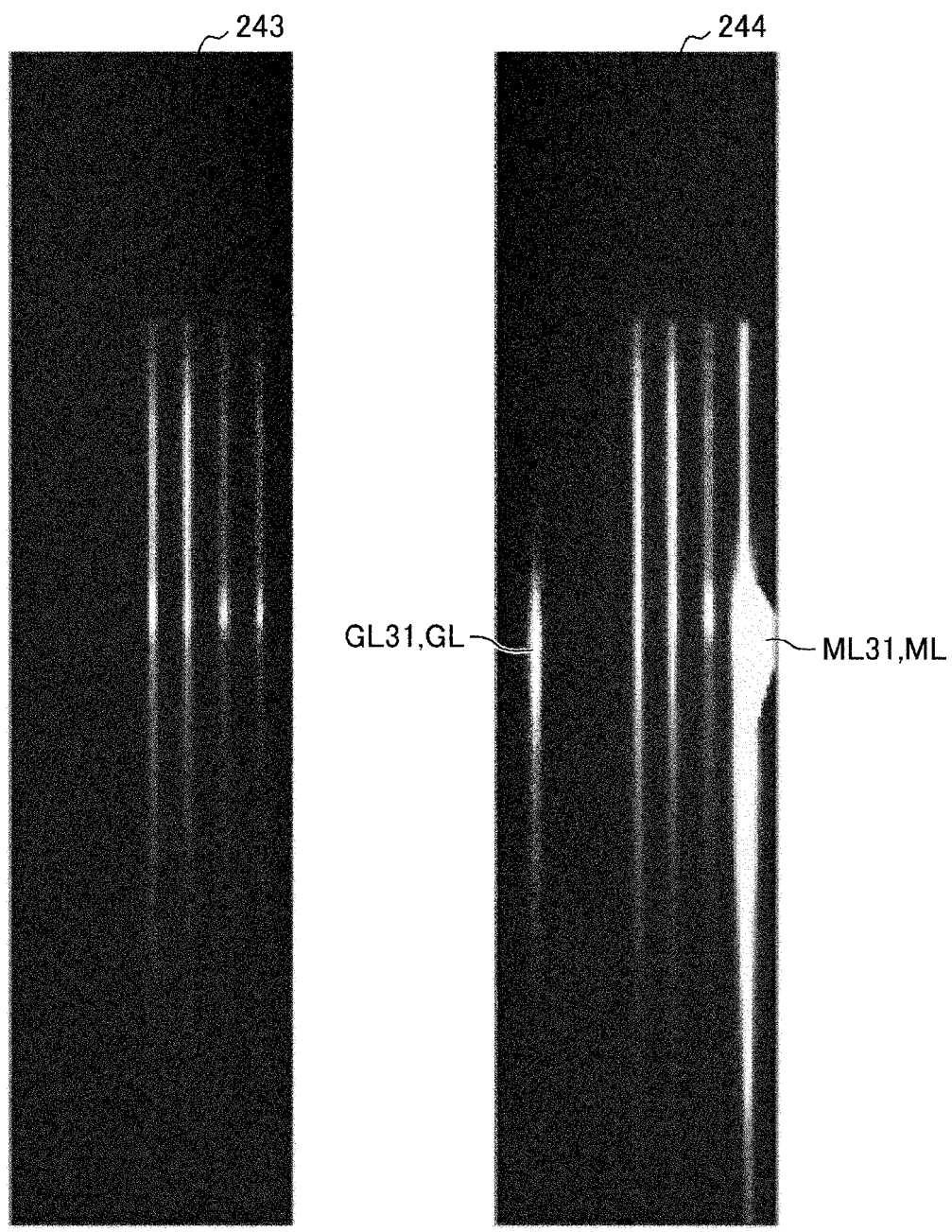
FIG. 9 illustrates images of emissions from four capillaries Ca when a sample is caused to flow in a specific capillary Ca.

Next, FIGS. 8 and 9 each illustrate actual results obtained by arranging the optical system P and the capillary array 10 such that the image of the capillary array 10 is shifted away from the center of the optical system P.

Similarly to FIGS. 6 and 7, FIG. 8 illustrates wavelength-dispersion images of Raman scattering lights by laser beam irradiation of the solutions contained in the respective capillaries Ca. An image 241 is obtained by adjusting exposure time to allow favorable observation of all the main wavelength-dispersion images ML21 to ML24 of the four capillaries Ca. The main wavelength-dispersion images ML21 to ML24 correspond to the channels 1 to 4 (CH1 to CH4) in this order. On the other hand, an image 242 is obtained by extending exposure time so as to allow favorable observation of all the ghost wavelength-dispersion images GL21 to GL24 of the four capillaries Ca under the same conditions as those of the image 241 except for exposure time. The ghost wavelength-dispersion images GL21 to GL24 correspond to the channels 1 to 4 (CH1 to CH4) in this order. Although positions of the main wavelength-dispersion images ML21 to ML24 in the image 242 are the same as those in the image 241, each signal intensity of ML21 to ML24 in the image 242 is oversaturated.

As apparent from the image 242, the ghost wavelength-dispersion images GL21 to GL24 do not overlap the main wavelength-dispersion images ML21 to ML24, and thus, crosstalk is avoided. That is, the occurrence of ghost has no influence on analysis.

FIG. 9 illustrates an image obtained when a sample is flowed in a specific capillary Ca. In case of FIG. 9, an image of the channel 1 (CH1) substantially passes through the center of the optical system P, and images of the channels 2 to 4 (CH2 to CH4) are arranged so as to be shifted rightward away from the center of the optical system P (respective centers of images 243 and 244).

The image 243 in FIG. 9 is the image when nothing is flowed through the four capillaries Ca and illustrates wavelength-dispersion images of Raman scattering lights by laser beam irradiation of the solutions contained in the respective capillaries Ca similarly to the image 241 in FIG. 8.

On the other hand, the image 244 in FIG. 9 illustrates wavelength-dispersion images of the respective capillaries Ca when the sample is flowed only in the channel 4 (CH4), appearing on the rightmost side in the image 244.

In the image 244, a ghost wavelength-dispersion image GL31 (GL) is superimposed on the image 243 together with a main wavelength-dispersion image ML31 (ML) of the sample flowing in the channel 4.

Although the ghost wavelength-dispersion image GL31 of the channel 4 is captured, it overlaps neither the main wavelength-dispersion image ML of the channel 4 in which the sample has been caused to flow nor any of main wavelength-dispersion images of all the channels. Therefore, no crosstalk occurs and there is no influence on the analysis.

Figure 26:
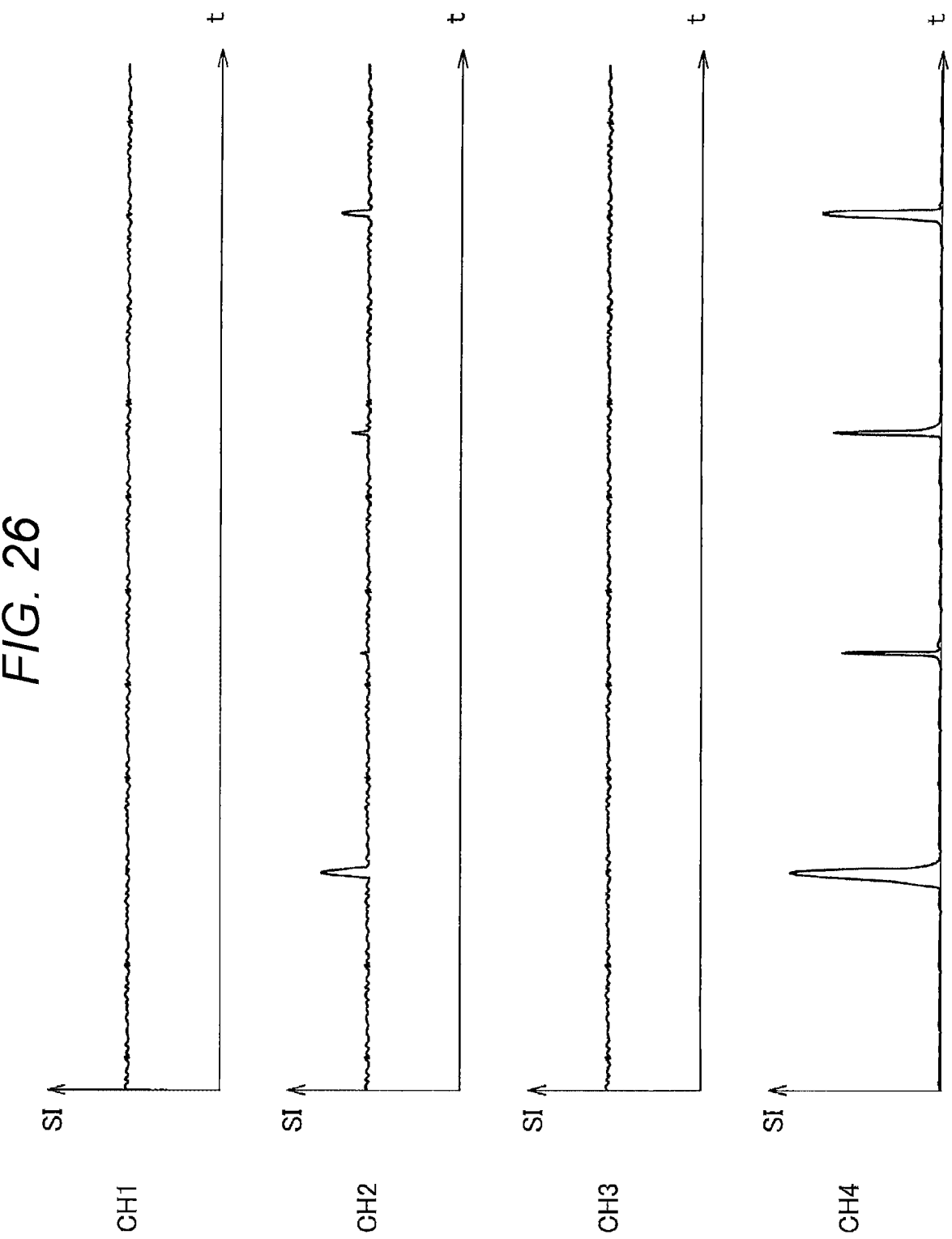
FIG. 26 illustrates change over time in signal intensity of each of capillaries Ca when a high concentration sample migrates in the channel 4.
Figure 28:
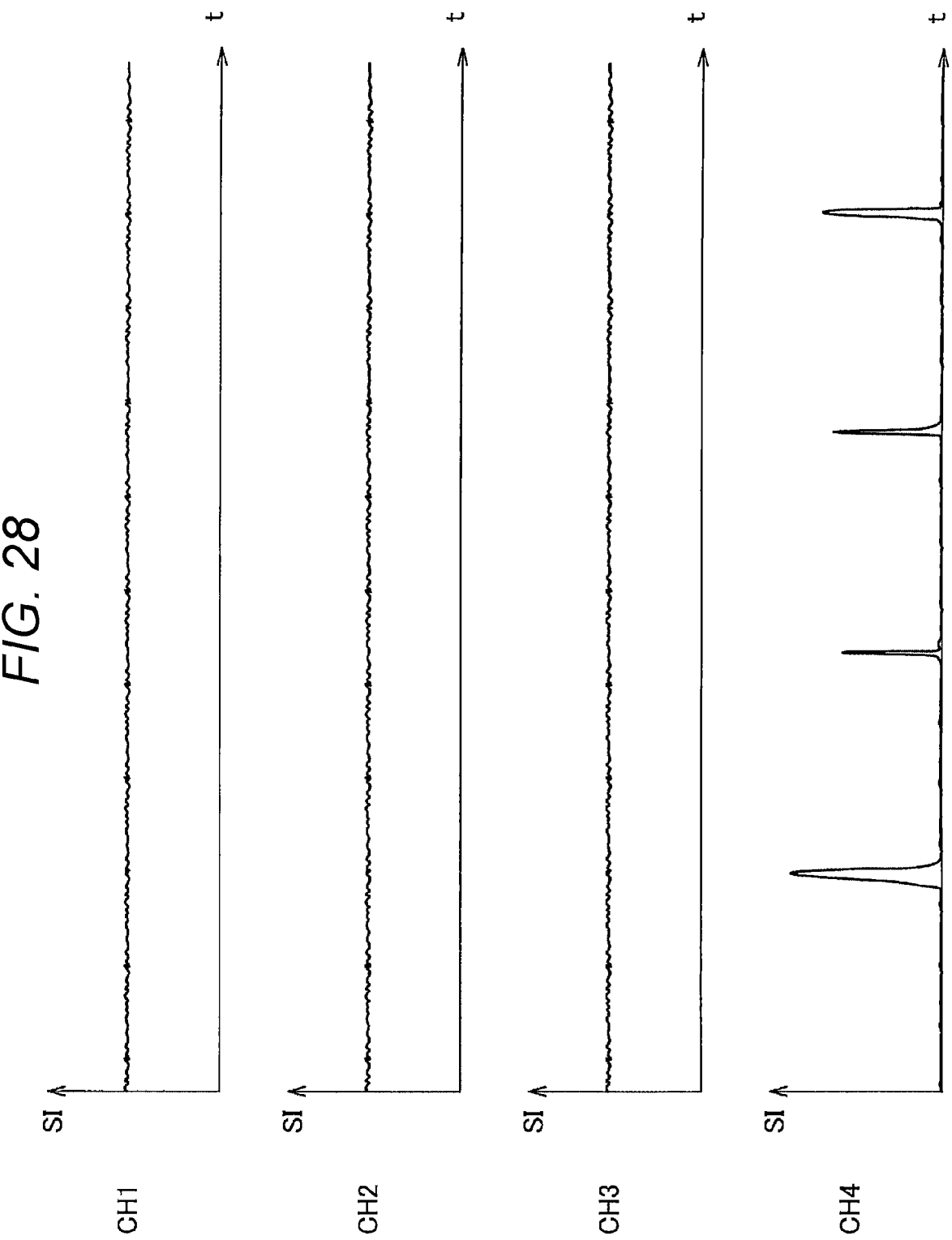
FIG. 28 illustrates change over time in signal intensity of each of capillaries Ca when a high concentration sample migrates in the channel 4 in case that the capillary array 10 is shifted.

FIG. 28 illustrates changes over times in signal intensity (SI) of each of the capillaries Ca under the following conditions. First, the capillary array 10 was shifted as is the same case of FIG. 9. Second, a high concentration sample was injected only into the channel 4, and electrophoresis was performed without injecting any sample into the other channels as is the same case of FIG. 26. Here, the vertical scale is enlarged for the channels 1 to 3. As a result, only baseline and noise are detected in the channels 1 to 3 unlike the case of FIG. 26. Further, a peak derived from the sample injected only into the channel 4 was detected in the channel 4.

In this manner, it has been confirmed that crosstalk can be avoided as expected by shifting the capillary array 10 away from the center of the optical system P.

Incidentally, the cases of the wavelength-dispersion images has been described herein, but the same results can be obtained even for cases of point images without wavelength dispersion.

As a countermeasure against crosstalk, it is essential to reduce a reflectance of each element (a camera lens, a filter, or the like) of an optical system P. However, such a countermeasure requires time and cost.

Since only the center of the optical system P is shifted according to the present embodiment, it is possible to promptly prevent crosstalk without increasing cost.

[Arrangement of Capillary Array 10 (Point Image)]

Next, the arrangement of the optical system P and the capillary array 10 will be described with reference to FIGS. 10A, 10B, 11A, and 11B, where point images without wavelength dispersion will be described.

Figure 10A:
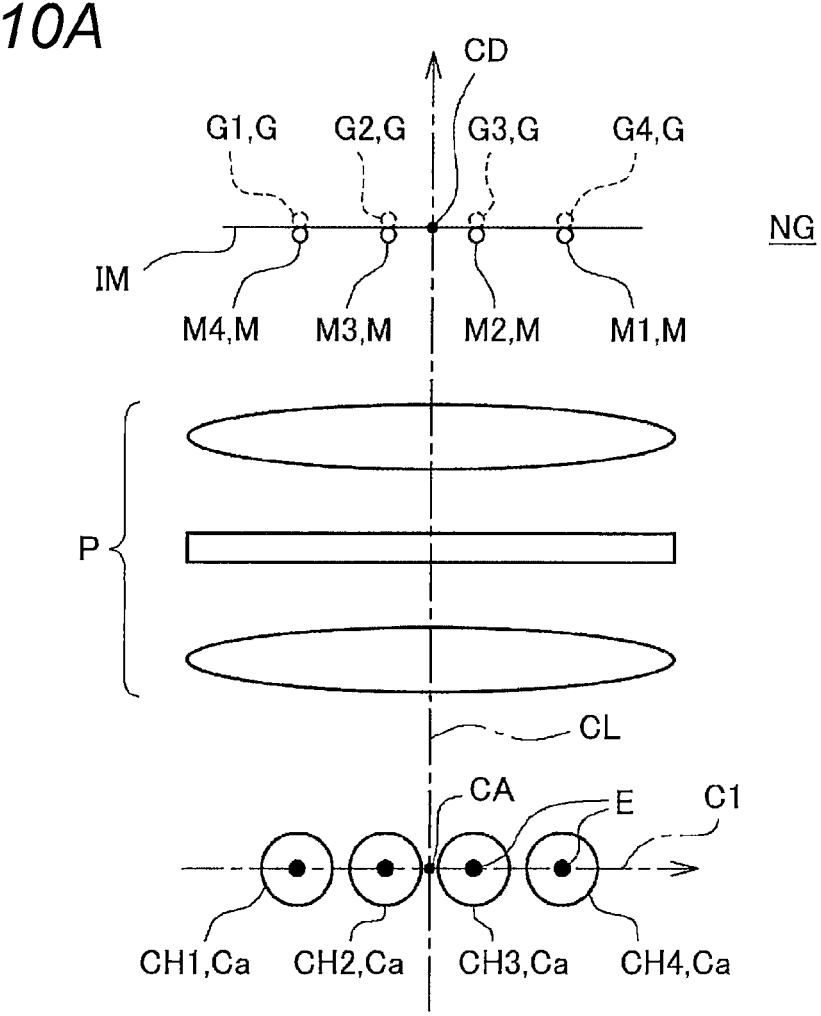
FIG. 10A illustrates an NG example (which means "an example with no good results" hereinafter) of an arrangement of an optical system P and a capillary array 10 and is viewed from perpendicular direction to an axis of the optical system P.
Figure 10B:
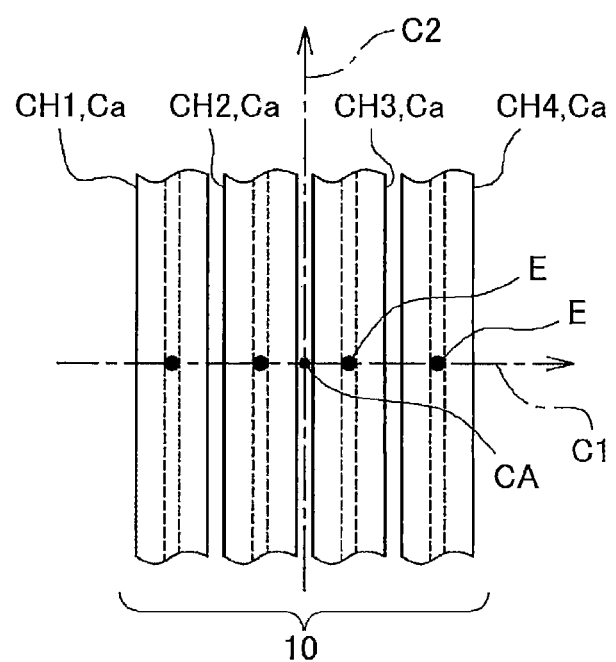
FIG. 10B illustrates the NG example in FIG. 10A and is viewed from parallel direction to the axis of the optical system P.

FIGS. 10B and FIG. 11B illustrate the capillary array 10 and light emission points E as viewed from the front.

In each of FIGS. 10A and 11A, the lower part illustrates the capillary array 10 and the light emission points E viewed from above in FIGS. 10B and 11B, that is, from the major axis direction of the capillaries Ca. The middle part illustrates the optical system P viewed from above in FIGS. 10B and 11B, that is, from the major axis direction of the capillaries Ca. The upper part illustrates the imaging element IM, the main images M, and the ghost images G viewed from above in FIGS. 10B and 11B.

In the lower part of each of FIGS. 10A and 11A and in FIGS. 10B, and 11B, solid lines of the capillaries Ca indicate outer diameters thereof, and dashed lines indicate inner diameters thereof. Further, black circles indicate the light emission points E. That is, the black circles indicate positions of the inner diameter portions irradiated with a laser beam in the capillaries Ca. The four capillaries Ca, i.e. the channels 1 to 4 (CH1 to CH4) are arranged. In each of FIGS. 10A and 11A, a dash-dot line in the vertical direction indicates a center line CL of the optical system P. The center line CL is not necessarily a single straight line. For example, when an optical path is bent by an optical element included in the optical system P, the center line CL is extended along such bending. When the optical path changes depending on wavelength of light, the optical path is defined for a single wavelength at a center of a mainly used wavelength band. Further, in FIGS. 10B and 11B, an intersection between a plane on which the capillary array 10 and the light emission points E are arrayed and the center line CL is defined as a center CA of the optical system P. In addition, in the upper part of each of FIGS. 10A and 11A, an intersection between a plane on which the main images M are arrayed and the center line CL is defined as a center CD of the optical system P.

In the upper part of each of FIGS. 10A and 11A, white circles indicate the main images (normal images) M, and dashed white circles indicate the ghost images G. The main images M are normal images that are not the ghost images G.

On the other hand, in each of FIGS. 10B and 11B, a first axis C1 is a straight line that is parallel to an arbitrary straight line where at least two or more of the plurality of light emission points E are aligned linearly, and passes through an origin (the center CA of the optical system P). Further, a second axis C2 is a straight line that is perpendicular to the first axis C1 (parallel to the major axis of the capillaries Ca) and passes through the origin (the center CA of the optical system P). The first axis C1 in the lower part of each of FIGS. 10A and 11A is the same as the first axis C1 in each of FIGS. 10B and 11B, respectively.

FIGS. 10A and 10B illustrate an NG example (an example in which crosstalk occurs) of the arrangement of the optical system. P and the capillary array 10.

As illustrated in each of the lower part of FIG. 10A, and FIG. 10B, the capillary array 10 is positioned such that the center CA of the optical system P is located at the center of the capillary array 10, that is, approximately at the midpoint between the respective light emission points E in the channels 2 and 3.

When the capillary array 10 is positioned in this manner, a ghost image G4 which is a ghost point image of the light emission point E of the channel 4, overlaps a main image M1 which is a normal point image of the light emission point E of the channel 1. This is because a ghost image G is generated at a point-symmetry position of a main image M with respect to the center CD of the optical system P. Similarly, a ghost image G3 from the channel 3, a ghost image G2 from the channel 2, and a ghost image G1 from the channel 1 overlap a main image M2 from the channel 2, a main image M3 from the channel 3, and a main image M4 from the channel 4, respectively. Incidentally, in the upper part of FIG. 10A, the overlapping main image M and ghost image G are illustrated with a slight shift in order to facilitate viewing of the drawing. Similar illustrations are applied to the subsequent drawings.

FIGS. 11A and 11B illustrate an OK example (example in which crosstalk does not occur) of the arrangement of the optical system P and the capillary array 10. In FIGS. 11A and 11B, the same configurations as those in FIGS. 10A and 10B will be denoted by the same reference signs, and the description thereof will be omitted.

As illustrated in each of the lower part of FIG. 11A, and FIG. 11B, all the light emission points E of the channels 1 to 4 of the capillaries Ca are arrayed so as to be shifted in one direction from the center CA of the optical system P. That is, the center CA of the optical system P is positioned outside the capillary array 10.

Since the capillary array 10 is positioned in this manner, the main images M1 to M4 and the ghost images G1 to G4 can be prevented from overlapping each other as illustrated in the upper part of FIG. 11A. This is because a ghost image G is generated at a point-symmetry position of a main image M with respect to the center CD of the optical system P. Moreover, the imaging element IM is positioned such that the center of the positions of the main images M is at the center of the imaging element IM as illustrated in the upper part of FIG. 11A. In other words, a position of a centroid of the imaging element IM is brought closer to a position of an overall centroid of the main images M from the position of the center CD of the optical system P. Alternatively, a distance between the position of the centroid of the imaging element IM and the position of the overall centroid of the main images M is set to be shorter than a distance between the position of the center CD of the optical system P and the position of the overall centroid of the main images M. The overall centroid of the main images M is a centroid of all the respective main images M. The overall centroid of the main images M is expressed by the following Formula (1).

[Formula 1]

$$T = \sum_{i=1}^{N} \sum_{j} (\text{LIGHT INTENSITY (PIXEL VALUE)} \times \text{COORDINATE}) \quad (1)$$

In Formula (1), T represents the overall centroid of the main images M, i represents main image number (i=1 to 4 in the example of FIG. 11A), N represents the number of the main images M (N=4 in the example of FIG. 11A), j represents coordinates belonging to each of the main images M. Incidentally, the overall centroid of the main images M substantially coincides with the center of the imaging element IM in the example of FIG. 11A.

More specifically, an intersection (that is, the center CD) between a plane where the main images M exist and the center line CL of the optical system P is present outside the imaging element IM. Then, only the main images M can be efficiently captured. At the same time, the ghost images G can be prevented from being captured.

In this manner, the capillary array 10 is positioned such that a midpoint of any two of light emission points E is away from the center CA (and the center line CL) of the optical system P in the arrangement illustrated in each of FIGS. 11A and 11B. In other words, a midpoint of any two of main images M is away from the center CD (and the center line CL) of the optical system P.

Then, crosstalk can be prevented without reducing the reflectance of each element of the optical system P. That is, it is possible to promptly avoid crosstalk without increasing cost.

Alternatively, the center CA of the optical system P exists outside a light emission point group consisting of the light emission points E in the arrangement illustrated in FIGS. 11A and 11B. In other words, the center CD of the optical system P exists outside a main image group consisting of the main images M. As a result, the main image group can be completely separated from a ghost image group consisting of the ghost images.

[Arrangement of Capillary Array 10 (Point Image and Wavelength-Dispersion Image)]

Next, the arrangement of the optical system P and the capillary array 10 considering wavelength dispersion will be described with reference to FIGS. 12 to 17.

In each of FIGS. 12 to 17, the lower part (lower view) illustrates the capillary array 10 viewed from the front. Since the lower views of FIGS. 12 to 17 are similar to FIGS. 10B and 11B, the same reference signs will be used, and the description thereof will be omitted. Black circles indicate the light emission points E in the lower views of FIGS. 12 to 17. That is, the black circles indicate positions of inner diameter portions irradiated with a laser beam in the capillaries Ca. Further, an intersection between two orthogonal dash-dot lines C1 and C2 (the former is perpendicular to the major axis of each of the capillaries Ca, and the latter is parallel to the major axis of each of the capillaries Ca) indicates the center CA of the optical system P. Incidentally, the centers CD and CE in each of the upper views and the middle views of FIGS. 12 to 17 have the same definition as the center CD in each of FIGS. 10A and 11A.

Further, the upper part (upper view) in each of FIGS. 12 to 17 illustrates point images of the light emission points E on a plane where the imaging element IM exists. Here, an imaging area of the imaging element IM is surrounded by a square. In the upper views of FIGS. 12 to 17, white circles M1 to M4 indicate main images M which are normal point images of the light emission points E of the channels 1 to 4 (CH1 to CH4), respectively. While, dashed white circles G1 to G4 indicate ghost images G which are ghost point images of the light emission points E of the channels 1 to 4, respectively.

Further, the middle part (middle view) in each of FIGS. 12 to 17 illustrates wavelength-dispersion images of the light emission points E on the plane where the imaging element IM exists. Here, an imaging area of the imaging element IM is also surrounded by a square in each of the middle views of FIGS. 12 to 17. The wavelength-dispersion images are obtained by arranging a diffraction grating or a prism inside the optical system P. In each of the middle view, the vertical direction corresponds to wavelength. For example, upward direction corresponds shorter wavelength, and downward direction corresponds longer wavelength. Further, in the each middle view, thick solid lines ML1 to ML4 indicate main wavelength-dispersion images ML which are normal wavelength-dispersion images, while thick dashed lines GL1 to GL4 indicate ghost wavelength-dispersion images GL which are ghost wavelength-dispersion images.

Moreover, in each of the lower views of FIGS. 12 to 17, a first axis C1 is a straight line that is parallel to an arbitrary straight line where at least two or more of the plurality of light emission points E are aligned linearly, and passes through an origin (the center CA of the optical system P). Further, a second axis C2 is a straight line that is perpendicular to the first axis C1 (parallel to the major axis of the capillaries Ca) and passes through the origin (the center CA of the optical system P).

FIG. 12 illustrates an NG arrangement example of the capillary array 10 and the optical system P for both the point images and the wavelength-dispersion images.

As illustrated in the lower view of FIG. 12, FIG. 12 illustrates an example in which the capillary array 10 and the optical system P are arranged similarly to FIGS. 10A and 10B.

Since the upper view in FIG. 12 is similar to the upper view in FIG. 10A, the description thereof is omitted here, but it can be seen herein that the main images M1 to M4 inconveniently overlap the ghost images G1 to G4.

Moreover, as illustrated in the middle view of FIG. 12, the ghost wavelength-dispersion image GL4 derived from the light emission point E of the channel 4 overlaps the main wavelength-dispersion image ML1 derived from the light emission point E of the channel 1. Similarly, the ghost wavelength-dispersion image GL3 derived from the light emission point E of the channel 3, the ghost wavelength-dispersion image GL2 derived from the light emission point E of the channel 2, and the ghost wavelength-dispersion image GL1 derived from the light emission point E of the channel 1 overlap the main wavelength-dispersion image ML2 derived from the light emission point E of the channel 2, the main wavelength-dispersion image ML3 derived from the light emission point E of the channel 3, and the main wavelength-dispersion image ML4 derived from the light emission point E of the channel 4, respectively.

In this manner, it is understood that crosstalk occurs in both the point images and the wavelength-dispersion images, and both the images are NG in the arrangement of the capillary array 10 and the optical system P illustrated in the lower view of FIG. 12.

FIG. 13 illustrates an OK arrangement example of the capillary array 10 and the optical system P for both the point images and the wavelength-dispersion images.

As illustrated in the lower view of FIG. 13, FIG. 13 illustrates an example in which the capillary array 10 and the optical system P are arranged to be shifted from each other similarly to FIGS. 11A and 11B.

Incidentally, in the middle views of FIGS. 13 to 17, the same configurations as those in FIG. 12 will be denoted by the same reference signs, and the description thereof will be omitted.

Since the reference signs in the upper view of FIG. 13 are the same as those in the upper view of FIG. 12, the description thereof is omitted here, but it can be seen herein that the main images M1 to M4 and the ghost images G1 to G4 are separately formed. Moreover, it is possible to avoid capturing the ghost images G1 to G4 by arranging the imaging element IM at a position where only the main images M1 to M4 are formed.

As illustrated in the middle view of FIG. 13, similar to the upper view, the main wavelength-dispersion images ML1 to ML4 and the ghost wavelength-dispersion images GL1 to GL4 are separately formed. Further, the imaging element IM is arranged at a position where only the main wavelength-dispersion images ML1 to ML4 are formed in the middle view of FIG. 13. That is, the center CE of the optical system P exists outside the main wavelength-dispersion image group consisting of the main wavelength-dispersion images ML. Then, it is possible to avoid capturing the ghost wavelength-dispersion images GL1 to GL4.

As illustrated in FIG. 13, the capillary array 10 is arranged such that a midpoint of any two of light emission points E is shifted away from the center CA (or the optical axis CL (see FIGS. 10A and 11A)) of the optical system P. In other words, a midpoint of any two of main images M and any two of main wavelength-dispersion images ML are shifted away from the centers CD and CE, respectively, of the optical system P.

Here, as illustrated in the middle view of FIG. 13, a ghost wavelength-dispersion image GL is generated at a point-symmetry position of a main wavelength-dispersion image ML with respect to the center CE of the optical system P. Moreover, as illustrated in the middle view of FIG. 13, the imaging element IM is positioned such that the center of the main wavelength-dispersion images ML is positioned at the center of the imaging element IM. In other words, a position of a centroid of the imaging element IM is brought closer to a position of an overall centroid of the main wavelength-dispersion images ML from the position of the center CE of the optical system P. Alternatively, a distance between the position of the centroid of the imaging element IM and the position of the overall centroid of the respective main wavelength-dispersion images ML is set to be shorter than a distance between the position of the center CE of the optical system P and the position of the overall centroid of the respective main wavelength-dispersion images ML.

Incidentally, the overall centroid of the main wavelength-dispersion images ML is expressed by the above-described Formula (1) where coordinate is every coordinate belonging to the main wavelength-dispersion images ML.

Then, crosstalk can be prevented without reducing the reflectance of each element of the optical system P. That is, it is possible to promptly avoid crosstalk without increasing cost.

Alternatively, the capillary array 10 does not straddle the center CA of the optical system. P in the lower view of FIG. 13. That is, the center CA of the optical system P exists outside a light emission point group consisting of the light emission points E. In other words, the center CD and the center CE of the optical system P exist outside a main image group consisting of the main images M and a main wavelength-dispersion image group consisting of the main wavelength-dispersion images ML, respectively.

Thus, the main image group and the ghost image group can be completely separated, and the main wavelength-dispersion image group and the ghost wavelength-dispersion image group can also be completely separated.

In this manner, it is possible to avoid crosstalk in both the point images and the wavelength-dispersion images, and both the images are OK in the arrangement of the capillary array 10 and the optical system P illustrated in the lower view of FIG. 13.

FIG. 14 illustrates an OK arrangement example of the capillary array 10 and the optical system P for the point images, but an NG arrangement example for the wavelength-dispersion images.

In FIG. 14, similar to FIG. 12, the capillary array 10 straddles the center CA of the optical system P as illustrated in the lower view. However, unlike FIG. 12, a straight line connecting any two of the light emission points E of the capillaries Ca does not pass through the center CA of the optical system P. That is, the lower view of FIG. 14 is different from the lower view of FIG. 12 in terms of the following points. The first axis C1 indicated by a dash-dot line that passes through the center CA of the optical system P and is perpendicular to the major axis of each of the capillaries Ca does not coincide with the straight line on which two or more light emission points E are arranged. However, the second axis C2 is arranged between the light emission point E of the channel 2 and the light emission point E of the channel 3.

Such an arrangement can be expressed as follows. An intersection (the center CA of the optical system P) between the optical axis and a plane where the light emission points E exist is set as an origin. Then, a coordinate of each of the light emission points E is represented by a vector from the origin (a vector connecting the light emission point E and the origin). When an area between two vectors with a maximum angle but a smaller angle than 180 degrees is defined, all vectors are included in this area. The maximum angle is the maximum among angles between any two vectors. In the example of the lower view in FIG. 14, the angle between the vector for the channel 1 (CH1) and the vector for the channel 4 (CH4) is the maxi=angle. Here, when a light emission point E has a spread, the coordinate of the light emission point E may be set as a centroid of the light emission point E. The centroid is the sum of (light intensity (pixel value)× coordinate) in the light emission point E.

With the above arrangement of the capillary array 10 and the optical system P, as illustrated in the upper view of FIG. 14, the main images M1 to M4 and the ghost images G1 to G4 are formed on the imaging element IM to be separated in the vertical direction. This is based on the fact that a ghost image G is formed at a point-symmetry position of a main image M with respect to the center CD of the optical system P. Therefore, no crosstalk occurs as for the main images M1 to M4, and the arrangement of the capillary array 10 and the optical system P illustrated in the lower view of FIG. 14 is OK.

Although the main images M1 to M4 and the ghost images G1 to G4 are formed on one imaging element IM in the upper view of FIG. 14, there is no influence on analysis since the main images M1 to M4 and the ghost images G1 to G4 are sufficiently separated.

On the other hand, in the wavelength-dispersion images as illustrated in the middle view of FIG. 14, because a part of each of the main wavelength-dispersion images ML1 to ML4 overlaps a part of each of the ghost wavelength-dispersion images GL1 to GL4, crosstalk occurs. Additionally, color shift occurs in the wavelength-dispersion images as illustrated in the middle view of FIG. 14. For example, the main wavelength-dispersion image ML2 and the ghost wavelength-dispersion image GL2 of the channel 2 are formed to be shifted in the wavelength dispersion direction. Therefore, light having a single wavelength emitted from the light emission point E of the channel 2 is detected as different wavelengths at the main wavelength-dispersion image ML2 and the ghost wavelength-dispersion image GL2. Therefore, the arrangement of the capillary array 10 and the optical system. P illustrated in the lower view of FIG. 14 is NG as for the wavelength-dispersion images.

However, the main wavelength-dispersion images ML and the ghost wavelength-dispersion images GL in the middle view of FIG. 14 can be completely separated in the vertical direction by arranging the capillary array 10 so that the light emission points E (laser beam irradiation positions) are located much higher than those in the lower view of FIG. 14. As a result, the crosstalk can be avoided. FIG. 7 is an example of such an arrangement.

FIG. 15 illustrates an OK arrangement example of the capillary array 10 and the optical system P for both the point images and the wavelength-dispersion images.

In FIG. 15, the capillary array 10 does not straddle the center CA of the optical system P as illustrated in the lower view. Moreover, similar to FIG. 14, a straight line connecting any two of the light emission points E of the capillaries Ca does not pass through the center CA of the optical system P.

With such an arrangement, the main images M1 to M4 and the ghost images G1 to G4 can be formed to be separated in the point images illustrated in the upper view of FIG. 15, and therefore crosstalk can be avoided. Moreover, as illustrated in the upper view of FIG. 15, the imaging element IM is arranged at a position so that only the main images M1 to M4 are captured. That is, the center CD of the optical system P exists outside a main image group consisting of the main images M. As a result, it is possible to avoid capturing the ghost images G1 to G4.

The upper view of FIG. 15 can be expressed as follows. The center CD which is an intersection of the central axis of the optical system P and a plane where the main images M exist is set as an origin. Then, a coordinate of each of main images M is represented by a vector (vector from the origin). When an area between two vectors with a maximum angle is defined, all vectors are included in this area. However, the above-described maximum angle is smaller than 180 degrees. The maximum angle is the maximum among angles between any two vectors. In the example of the upper view in FIG. 15, the angle between the vector for the main image M1 and the vector for the main image M4 is the maximum angle. When a main image M has a spread, the coordinate of the main image M may be a centroid of the main image M. The centroid is the sum of (light intensity (pixel value)× coordinate) in the main image M.

Further, with the arrangement illustrated in the lower view of FIG. 15, the main wavelength-dispersion images ML1 to ML4 and the ghost wavelength-dispersion images GL1 to GL4 can be separately formed as illustrated in the middle view of FIG. 15, and therefore crosstalk can be avoided. Moreover, as illustrate in the middle view of FIG. 15, the imaging element IM is arranged at a position so that only the main wavelength-dispersion images ML1 to ML4 are captured. That is, the center CE of the optical system P exists outside a main wavelength-dispersion image group consisting of the main wavelength-dispersion images ML. In addition, the center CE of the optical system P is present outside the imaging element IM on a plane where the wavelength-dispersion images exist. As a result, it is possible to avoid capturing the ghost wavelength-dispersion images GL1 to GL4.

The middle view of FIG. 15 can be expressed as follows. The center CE of the optical system P is set as the origin on the plane where the main wavelength-dispersion images ML exist. Then, a coordinate of each of main wavelength-dispersion images ML is represented by a vector (vector from the origin). When an area between two vectors with a maximum angle is defined, all vectors are included in the above-described area. However, the above-described maximum angle is smaller than 180 degrees. In the definition of the angle in the upper view of FIG. 15, the centroid of the main images M is set as a centroid of the main wavelength-dispersion images ML. The coordinate of the main wavelength-dispersion image ML may be the centroid of the main wavelength-dispersion image ML. The centroid is the sum of light intensity (pixel value)×coordinate.

As described above, both the point images and the wavelength-dispersion images can be set to OK by arranging the capillary array 10 and the optical system P as illustrated in the lower view of FIG. 15.

Incidentally, a set of the capillary array 10 is arranged to be shifted away from the center CA of the optical system P so as not to straddle the center CA of the optical system P in the embodiment illustrated in FIGS. 11A, 11B, 13, and 15. It is necessary to be careful so as not to arrange another set of different capillary array 10 at a point-symmetry position of the capillary array 10 with respect to the center CA of the optical system P. For this purpose, it is advantageous to adopt a device configuration in which it is difficult to install two sets (or a plurality of sets) of capillary arrays 10 on both sides of the center CA of the optical system P.

FIG. 16 illustrates an NG arrangement example of the capillary array 10 and the optical system P for both the point images and the wavelength-dispersion images.

In FIG. 16, the capillary array 10 straddles the center CA of the optical system P as illustrated in the lower view. Moreover, the capillary array 10 and the optical system P are arranged such that the light emission point E that is the laser beam irradiation position of the channel 2 and the center CA of the optical system P are at the same position.

With such an arrangement, the main image 144, which is the normal point image of the light emission point E of the channel 4, does not overlap any of the ghost images G, which are the ghost point images of the light emission points E, as illustrated in the upper view of FIG. 16. On the other hand, the main image M2 of the channel 2 overlaps the ghost image G2 of the same channel 2, and thus, crosstalk does not occur. However, the main image M1 of the channel 1 overlaps the ghost image G3 of the channel 3, and the main image M3 of the channel 3 overlaps the ghost image G1 of the channel 1, and thus, crosstalk occurs between the channel 1 and the channel 3.

As described above, the point images are NG in some capillaries Ca in the arrangement of the capillary array 10 and the optical system P as illustrated in the lower view of FIG. 16. In the example of FIG. 16, however, the channels 2 and 4 can be used since its main image M overlaps its own ghost image G, or its main image M does not overlap any other ghost image G.

Similarly, the main wavelength-dispersion image ML4 of the channel 4 does not overlap any of the ghost wavelength-dispersion images GL as illustrated in the middle view of FIG. 16. Further, the main wavelength-dispersion image ML2 of the channel 2 overlaps the ghost wavelength-dispersion image GL2 of the same channel 2, and thus, crosstalk does not occur. However, the main wavelength-dispersion image ML1 of the channel 1 overlaps the ghost wavelength-dispersion image GL3 of the channel 3, and the main wavelength-dispersion image ML3 of the channel 3 overlaps the ghost wavelength-dispersion image GL1 of the channel 1, and thus, crosstalk occurs between the channel 1 and the channel 3.

As described above, the wavelength-dispersion images are NG in some capillaries Ca in the arrangement of the capillary array 10 and the optical system P as illustrated in the lower view of FIG. 16. In the example of FIG. 16, however, the channel 2 can be used since its main wavelength-dispersion image ML overlaps its own ghost wavelength-dispersion image GL. Further, the channel 4 can be used since its main wavelength-dispersion image ML does not overlap any other ghost wavelength-dispersion image GL.

Similarly to the case of FIG. 16, when the capillary array 10 and the optical system P are arranged such that the light emission point E of the channel 3 and the center CA of the optical system P are at the same position, the arrangement is NG because crosstalk occurs between the channel 2 and the channel 4. However, when the capillary array 10 and the optical system P are arranged such that the light emission point E of the channel 1 or the light emission point E of the channel 4 and the center CA of the optical system P are at the same position, only the channel 1 or the channel 4 overlap its own ghost. Therefore, the arrangement is OK because crosstalk can be avoided.

FIG. 17 illustrates another OK arrangement example of the capillary array 10 and the optical system P for both point images and wavelength-dispersion images.

As illustrated in the lower view in FIG. 17, the capillary array 10 and the optical system P are arranged such that the capillary array 10 straddles the center CA of the optical system P, and the center CA of the optical system P is closer to the light emission point E of the channel 2 than a midpoint between the light emission point E of the channel 2 and the light emission point E of the channel 3.

Such an arrangement of the capillary array 10 can be expressed as follows. The center CA of the optical system P is set as an origin on a plane where the light emission points E exist. Then, coordinates of any two light emission points E among the plurality of the light emission points E are represented by two vectors from the origin. In the arrangement, all angles between the two vectors from the origin are approximately 0 degrees or approximately 180 degrees.

With such an arrangement, the main images M1 to M4 do not overlap any of the ghost images G1 to G4 as illustrated in the upper view of FIG. 17.

In other words, with the arrangement as illustrated in the lower view of FIG. 17, the main images M1 to M4 and the ghost images G1 to G4 can be separately formed as illustrated in the upper view of FIG. 17, and thus crosstalk can be avoided. Although the main images M1 to M4 and the ghost images G1 to G4 are captured by one imaging element IM as illustrated in the upper view of FIG. 17, there is no influence on analysis since the main images M1 to M4 and the ghost images G1 to G4 are sufficiently separated.

When a distance between adjacent capillaries Ca (between the centers of the capillaries Ca) is substantially constant x1, and a distance between the center CA of the optical system P, and the capillary Ca (the channel 2 in the example of FIG. 17) closest to the center CA of the optical system P is X1, it is preferable to adopt the arrangement such that X1=x1/4 is satisfied. This is because separation distances between the adjacent main images M and ghost images G are maximized and the influence of crosstalk can be minimized by the arrangement.

As illustrated in the lower view of FIG. 17, when a capillary array 10 is arranged to straddle a center CA of an optical system P, a means for avoiding crosstalk can be generalized and expressed as follows. First, it is assumed that light emission points E are arrayed on the same plane, substantially on the same straight line, and at substantially equal intervals, or arrayed on the same plane in a lattice shape. Next, a first axis C1, which is parallel to any straight line where at least some of the light emission points E are aligned linearly and passes through an origin (the center CA of the optical system P), is set on the plane. Then, a second axis C2, which is perpendicular to the first axis C1 and passes through the origin (the center CA of the optical system P) is set on the plane. Further, an interval between the light emission points E in the direction of the first axis C1 is set as x1, and an interval between the light emission points E in the direction of the second axis C2 is set as x2 (not illustrated since x2=0 in the example in the lower view of FIG. 17).

On the other hand, a distance between the light emission point E (the light emission point E of the channel 2 in the lower view of FIG. 17) closest to the origin (the center CA of the optical system P), and the second axis C2 is set as X1. And a distance between the former closest light emission point E and the first axis C1 is set as X2 (not illustrated since X2=0 in the example of FIG. 17). Incidentally, X1=x1/4 and X2=0 in the lower view of FIG. 17.

In general, it is preferable that X1 and X2 satisfy the following conditions.

When conditions of (A1) $0 \leq X1 < \frac{1}{2}*x1$ and (A2) $0 \leq X2 < \frac{1}{2}*x2$ are defined, at least one of (A1) and (A2) is satisfied. In addition, a condition of (A3) X1 and X2 are not zero at the same time is satisfied. Incidentally, $X1 \neq 0$ and X2=0 are satisfied in the lower view of FIG. 17.

These conditions can be further narrowed down as follows.

At least one condition of (B1) $\frac{1}{8}*x1 \leq X1 \leq \frac{3}{8}*x1$ and (B2) $\frac{1}{8}*x2 \leq X2 \leq \frac{3}{8}*x2$ is satisfied. In the lower view of FIG. 17, the condition of (B1) is satisfied.

These conditions can be much further narrowed down as follows.

At least one condition of (D1) $X1 \approx \frac{1}{4}*x1$ and (D2) $X2 \approx \frac{1}{4}*x2$ is satisfied. In the lower view of FIG. 17, the condition of (D1) is satisfied.

Subsequently, with the arrangement as illustrated in the lower view of FIG. 17, the main wavelength-dispersion images ML1 to ML4 and the ghost wavelength-dispersion images GL1 to GL4 can be separately formed as illustrated in the middle view of FIG. 17, and thus crosstalk can be avoided. Incidentally, the main wavelength-dispersion images ML1 to ML4 and the ghost wavelength-dispersion images GL1 to GL4 are captured on one imaging element IM in the middle view of FIG. 17. However, there is no influence on analysis since the main wavelength-dispersion images ML1 to ML4 and the ghost wavelength-dispersion images GL1 to GL4 are separately formed.

As described above, the main images M and the ghost images G, or the main wavelength-dispersion images ML and the ghost wavelength-dispersion images GL are formed without overlapping each other on the same imaging element IM according to the arrangement illustrated in FIG. 17. As a result, even when it is difficult to arrange the imaging element IM at a position so that only the main images M or only the main wavelength-dispersion images ML are captured because number of capillaries Ca or number of light emission points E is large, it is possible to avoid crosstalk or reduce influence of crosstalk.

The upper view of FIG. 17 can be expressed as follows. An intersection of the optical axis (the center CD of the optical system P) and a plane where the point images exist is set as an origin. Then, coordinates of any two main images M are represented by two vectors (vectors from the origin). In the arrangement, all angles between the two vectors from the origin are approximately 0 degrees or approximately 180 degrees.

The middle view of FIG. 17 can be expressed as follows. An intersection of the optical axis (the center CE of the optical system P) and a plane where the wavelength-dispersion images exist is set as an origin. Then, coordinates of any two main wavelength-dispersion images ML are represented by two vectors (vectors from the origin). In the arrangement, all angles between the two vectors from the origin are approximately 0 degrees or approximately 180 degrees.

[Application to Microarray]

The case where the plurality of light emission points E are arrayed on the straight line, that is, in a one-dimensional manner, has been mainly described so far using the capillary electrophoresis device W (see FIGS. 1 and 2) as an application example. However, it is needless to say that the above-described method can be applied not only to the capillary array electrophoresis but also to another analysis method where a plurality of light emission points E are arrayed in a one-dimensional manner. Hereinafter, a case where a plurality of light emission points E are two-dimensionally arrayed will be described using a microarray as an application example. Similarly, it is needless to say that the present embodiment can be applied not only to the microarray but also to a case where a plurality of light emission points E are arrayed two-dimensionally. In the microarray, various types of probes are discretely fixed on a substrate and are subjected to reaction with various types of target components contained in a sample. Further, the microarray is a method in which the types and amounts of the probes that have reacted are detected by observing the entire substrate using chemiluminescence and fluorescence and the types and amounts of the target components contained in the sample are analyzed. In other words, among the plurality of light emission points E arrayed in a two-dimensional manner at positions of the various probes arrayed on the substrate, which light emission points E emit light and how much the emission is are measured. In general, the array of the plurality of light emission points E on the two-dimensional plane, that is, the array of the various probes on the substrate is formed into a lattice shape in many cases in order to facilitate the correspondence between the position of the light emission point E and the type of the probe. Nucleic acids such as deoxyribonucleic acid (DNA) and ribonucleic acid (RNA), or proteins can be used as probes and targets of the microarray.

Further, hybridizations or antigen-antibody reactions can be used as the reactions between the probes and the targets.

An example in which the present embodiment is applied to the microarray or the like will be described with reference to FIGS. 18 to 23.

In each of FIGS. 18 to 21, the lower view illustrates a plane on which a plurality of light emission points E in the microarray are arrayed and a relationship between each of these light emission points E and a center CA of an optical system P, which is an intersection of the plane and a center line CL of the optical system P (see FIGS. 10A and 11A), and the upper view illustrates point images of the light emission points E on a plane where an imaging element IM exists.

In each of the lower views of FIGS. 18 to 21, black circles indicate the light emission points E in the microarray, and dash-dot lines indicate a first axis C1 and a second axis C2 that are orthogonal to each other. Further, an intersection of these axes indicates the center CA of the optical system P. Besides, the light emission points E exist in a 4×4 square lattice shape, and two orthogonal grid lines are parallel to the first axis C1 and the second axis C2, respectively.

In the upper views of FIGS. 18 to 21, white circles indicate main images ME derived from the light emission points E, and triangles indicate ghost images GE. Then, a square area indicated by reference sign IM indicates the imaging element IM and an imaging area of the imaging element IM in each of the upper views of FIGS. 18 to 21.

In addition, an intersection of a plane on which the main images ME are arranged and the center line CL is a center CF of the optical system P in each of the upper views of FIGS. 18 to 21.

FIG. 18 is illustrates an NG (crosstalk occurrence) arrangement example of the plurality of light emission points E in the microarray.

First, the optical system P is arranged such that the center CA of the optical system P substantially coincides with a centroid of a light emission point group as illustrated in the lower view of FIG. 18. Further, intervals between the adjacent light emission points E in the first axis C1 direction and the second axis C2 direction are respectively set as x1 and x2 (x1=x2 in the lower view of FIG. 18). An interval between the light emission point E closest to the center CA of the optical system P (for example, a light emission point E6 in the lower view of FIG. 18) and the second axis C2 and the first axis C1 are respectively set as X1 and X2 as illustrated in the lower view of FIG. 18. Then, X1=x1/2 and X2=x2/2 are satisfied.

With such an arrangement, for example, a ghost image GE1, which is a ghost point image of a light emission point E1 in the lower view, overlaps a main image ME16, which is a normal point image of a light emission point E16 in the lower view, as illustrated in the upper view of FIG. 18. Further, a ghost image GE2 derived from a light emission point E2 in the lower view overlaps a main image ME15 of a light emission point E15 in the lower view. The other ghost images GE also overlap the other main images ME. These are based on the fact that the ghost images GE are generated at point-symmetry positions of the main images ME with respect to the center CF of the optical system P.

In this manner, the main images ME and the ghost images GE overlap each other so that crosstalk occurs in the arrangement as illustrated in the lower view of FIG. 18, which is not preferable.

FIG. 19 illustrates an OK (no crosstalk occurrence) arrangement example of the plurality of light emission points E in the microarray.

In FIG. 19, the optical system P is arranged such that the center CA of the optical system P deviates from the light emission point group as illustrated in the lower view.

With such an arrangement, the ghost images GE do not overlap the main images ME derived from the light emission points E as illustrated in the upper view of FIG. 19, and thus crosstalk can be avoided. This is because the ghost images GE corresponding to the main image ME is generated at point-symmetry positions with respect to the center CF of the optical system P.

Further, the imaging element IM is arranged at a position so that only the main images ME are captured as illustrated in the upper view of FIG. 19. As a result, it is possible to avoid capturing the ghost images GE.

Incidentally, when the two orthogonal axes (the first axis C1 and the second axis C2) are regarded as the x axis and the y axis, respectively, the light emission point group is arranged to be located in the fourth quadrant as illustrated in the lower view of FIG. 19. However, the present invention is not limited thereto, and the light emission point group may be arranged in any of the first quadrant, the second quadrant, and the third quadrant. Further, the light emission point group may be arranged so as to straddle the first quadrant and the second quadrant. Similarly, the light emission point group may be arranged so as to straddle the second quadrant and the third quadrant, or the third quadrant and the fourth quadrant, or the fourth quadrant and the first quadrant.

The arrangement of the light emission points E in the lower view of FIG. 19 can be expressed as follows.

First, the center CA of the optical system P exists outside the light emission point group consisting of the plurality of light emission points E.

The arrangement in the upper view of FIG. 19 can be expressed as follows.

The center CF of the optical system P exists outside a main image group consisting of the main images ME. Further, when the center CF of the optical system P is set as an origin on a plane where the point images exists, a coordinate of an arbitrary main image ME is represented by a vector, and an area between two vectors with a maximum angle is defined, all vectors are included in this area. Here, the above-described maximum angle is smaller than 180 degrees. In the upper view of FIG. 19, the two vectors having the maximum angle are vectors which connects the main image ME4 and the main image ME13 with the center CF of the optical system P. The main image ME4 corresponds to a light emission point E4 in the lower view of FIG. 19, and the main image ME13 corresponds to a light emission point E13 in the lower view of FIG. 19. Moreover, the center CF of the optical system P is present outside the imaging area of the imaging element IM.

FIG. 20 illustrates another OK (no crosstalk occurrence) arrangement example of the plurality of light emission points E in the microarray.

In the lower view of FIG. 20, unlike the lower view of FIG. 19, the center CA of the optical system P exists inside the light emission point group.

As illustrated in the lower view of FIG. 20, the first axis C1, which is parallel to the arrangement of the plurality of light emission points E on an arbitrary straight line included in the lattice-shaped array and passes through the origin (center CA of the optical system P), and the second axis C2 which is perpendicular to the first axis C1 and passes through the origin (center CA of the optical system P) are defined. Then, an interval between the adjacent light emission points E in the direction of the first axis C1 is set as x1, and an interval between the adjacent light emission points E in the direction of the second axis C2 is set as x2.

Further, distances between the light emission point E closest to the origin (center CA of the optical system. P) (the light emission point E6 on the second row from the top and on the second column from the left in the lower view of FIG. 20) and the second axis C2, and the first axis C1 are defined as X1, and X2 (not illustrated), respectively.

At this time, the light emission points E are arranged such that X1=x1/4 and X2=0 are satisfied in the lower view of FIG. 20.

When the optical system P is arranged as illustrated in the lower view of FIG. 20, the main images ME of the light emission point E and the ghost image GE are obtained as illustrated in the upper view of FIG. 20.

As illustrated in the upper view of FIG. 20, the main images ME and the ghost images GE are separately formed on the imaging element IM. More specifically, the ghost images GE are formed in the middle of the adjacent main images ME. Therefore, crosstalk can be avoided with the arrangement of FIG. 20. Although the main images ME and the ghost images GE are formed on the same imaging element IM as illustrated in the upper view of FIG. 20, there is no influence on analysis since the main images ME and the ghost images GE are separately formed.

In general, it is preferable that X1 and X2 satisfy the following conditions in order to avoid crosstalk.

When conditions of (A1) $0 \leq X1 < \frac{1}{2}*x1$ and (A2) $0 \leq X2 < \frac{1}{2}*x2$ are defined, at least one of (A1) and (A2) is satisfied. In addition, a condition of (A3) X1 and X2 are not zero at the same time is satisfied.

These conditions can be further narrowed down as follows.

At least one condition of (B1) $\frac{1}{8}*x1 \leq X1 \leq \frac{3}{8}*x1$ and (B2) $\frac{1}{8}*x2 \leq X2 \leq \frac{3}{8}*x2$ is satisfied.

These conditions can be much further narrowed down as follows.

At least one condition of (D1) $X1 \cong \frac{1}{4}*x1$ and (D2) $X2 \approx \frac{1}{4}*x2$ is satisfied.

For example, it is preferable to perform the arrangement such that X1=0 and X2=x2/4 are satisfied.

Then, even when it is difficult to arrange the imaging element IM at a position so that only the main images ME are captured because number of light emission points E is large, it is possible to avoid crosstalk.

FIG. 21 illustrates another OK (no crosstalk occurrence) arrangement example of the plurality of light emission points E in the microarray.

As illustrated in the lower view of FIG. 21, the optical system P and the light emission point E are arranged such that X1=x1/4 and X2=x2/4 are satisfied. Here, x1, X1, x2, and X2 have the same definitions as those in FIG. 20.

With the arrangement as illustrated in the lower view of FIG. 21, the main images ME of the light emission points E and the ghost images GE are separately formed on the imaging element IM as illustrated in the upper view of FIG. 21, and thus crosstalk can be avoided. Further, with the arrangement as illustrated in the lower view of FIG. 21, the main images ME and the ghost images GE are formed most separately from each other on the imaging element IM as illustrated in the upper view of FIG. 21, and thus crosstalk can be avoided most efficiently. Although the main images ME and the ghost images GE are captured on the same imaging element IM, there is no influence on analysis since the main images ME and the ghost images GE are formed separately from each other.

Then, even when it is difficult to arrange the imaging element IM at a position so that only the main images ME are captured because number of light emission points E is large, it is possible to avoid crosstalk.

Next, still another OK arrangement examples will be described with reference to FIGS. 22 to 24.

Figure 22:
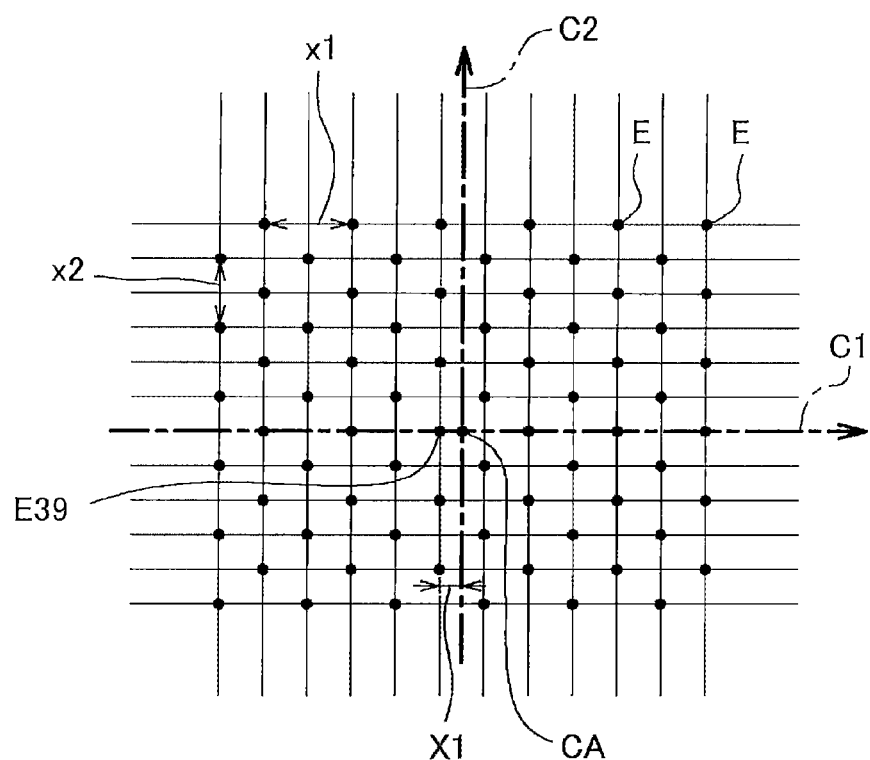
FIG. 22 illustrates an arrangement example in which light emission points E are arranged in a rhombic lattice.
Figure 23:
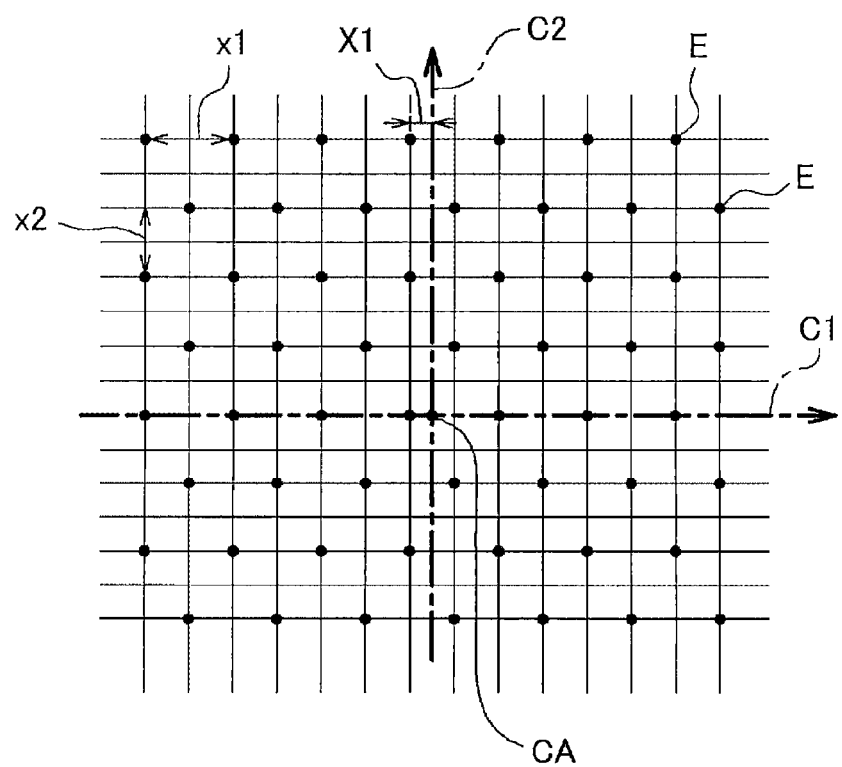
FIG. 23 illustrates an arrangement example in which light emission points E are arranged in a hexagonal lattice.
Figure 24:
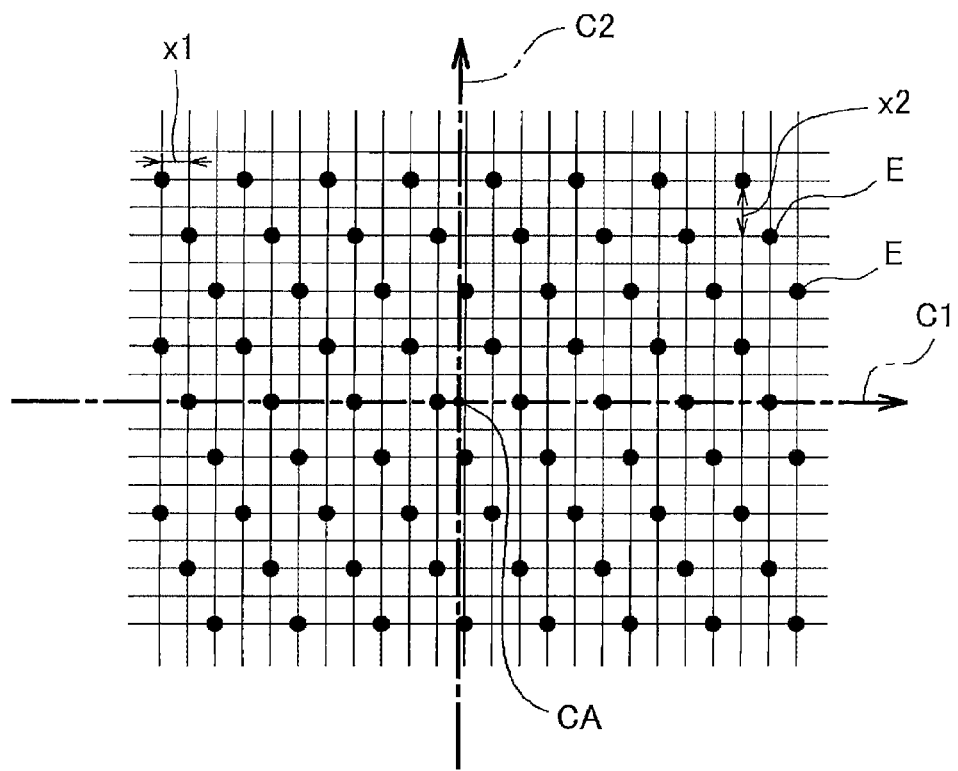
FIG. 24 illustrates an arrangement example in which light emission points E are arranged in a parallelotope lattice.

Each of FIGS. 22 to 24 only illustrate the arrangement relationship between the light emission points E and the optical system P (corresponding to the lower views of FIGS. 18 to 21).

(Rhombic Lattice)

FIG. 22 illustrates an example in which the light emission points E are arranged in a rhombic lattice pattern on the same plane.

In FIG. 22, similarly to the lower view of FIGS. 20 and 21, the first axis C1, which is parallel to the arrangement of the plurality of light emission points E on a straight line in the horizontal direction in the drawing included in the lattice-shaped array and passes through the origin (the center CA of the optical system P), and the second axis C2 which is perpendicular to the first axis C1 and passes through the origin (the center CA of the optical system P) are set. Then, an interval between the adjacent light emission points E in the direction of the first axis C1 is set as x1, and an interval between the adjacent light emission points E in the direction of the second axis C2 is set as x2. Further, a distance between the light emission point E closest to the origin (the center CA of the optical system P) (a light emission point E39 in the example of FIG. 22) and the second axis C2 is defined as X1, and a distance between the light emission point E closest to the origin and the first axis C1 is defined as X2 (not illustrated).

In FIG. 22, similarly to the upper views of FIGS. 20 and 21, the light emission points E are arranged such that X1=x1/4 and X2=0 are satisfied. Then, the main images ME and the ghost images GE can be separated from each other on the image plane, and thus crosstalk can be avoided.

Other than these conditions, any of the conditions described in (A1) to (A3), (B1) to (B2), and (D1) to (D2) is preferably satisfied. For example, X1=0 and X2=x2/4 may be satisfied.

(Hexagonal Lattice)

FIG. 23 illustrates an example in which the light emission points E are arranged in a hexagonal lattice pattern on the same plane. The first axis C1, the second axis C2, x1, x2, X1, and X2 (not illustrated) are defined similarly to FIG. 22.

In FIG. 23, similarly to the upper views of FIGS. 20 and 21, the light emission points E are arranged such that X1=x1/4 and X2=0 are satisfied. Then, the main images ME and the ghost images GE can be separated from each other on the image plane, and thus crosstalk can be avoided.

Other than these conditions, any of the conditions described in (A1) to (A3), (B1) to (B2), and (D1) to (D2) is preferably satisfied. For example, X1=0 and X2=x2/4 may be satisfied.

Alternatively, the main images ME and the ghost images GE can be separated from each other on the imaging plane even if the light emission points E are arranged such that X1=x1/8 and X2=x2/8 are satisfied. That is, crosstalk can be avoided.

(Parallelotope Lattice)

FIG. 24 illustrates an example in which the light emission points E are arranged in a parallelotope lattice shape on the same plane.

The first axis C1, the second axis C2, x1, x2, X1, and X2 are defined similarly to FIG. 22.

In FIG. 24, similarly to the upper views of FIGS. 20 and 21, the light emission points E are arranged such that X1=x1/4 and X2=0 are satisfied, then the main images ME and the ghost images GE can be separated from each other on the image plane, and thus crosstalk can be avoided.

Other than these conditions, any of the conditions described in (A1) to (A3), (B1) to (B2), and (D1) to (D2) is preferably satisfied. For example, X1=0 and X2=x2/4 may be satisfied.

Incidentally, when distances between different point images or wavelength-dispersion images, distances between the point images or the wavelength-dispersion images and the center CA, CD, CE, or CF of the optical system P, distances between different light emission points E, and distances between the point images and the first axis C1 or the second axis C2 are measured, each centroid thereof may be used as each of positions or coordinates of the light emission points E, the point images, and the wavelength-dispersion images. Here, the centroid is defined as the sum of products of light intensities (pixel values) and coordinates in the light emission point E, the point image, and the wavelength-dispersion image. Then, the above-described coordinates and distances can be defined even when the light emission points, the point images, and the wavelength-dispersion images have spreads.

The present invention is not limited to the above-described embodiments and includes various modification examples. For example, the above-described embodiments have been described in detail in order to describe the present invention in an easily understandable manner and are not necessarily limited to one including the entire configuration that has been described above. Further, configurations of another embodiment can be substituted for some configurations of a certain embodiment, and a configuration of another embodiment can be added to a configuration of a certain embodiment. Further, addition, deletion or substitution of other configurations can be made with respect to some configurations of each embodiment.

Further, control lines and information lines considered to be necessary for the description have been illustrated in the respective embodiments, and not all of the control lines and information lines required as a product are illustrated. It may be considered that most of configurations are practically connected to each other.

REFERENCE SIGNS LIST 10 capillary array
111 measured part
130 measurement unit
CA, CD, CE, CF center (optical axis)
C1 first axis
C2 second axis
Ca capillary
E, E1, E2, E15, E16 light emission point
G, G1 to G4 ghost point image
GE, GE1, GE2 ghost point image
GL, GL1 to GL4, GL11 to GL19, GL21 to GL24, GL31 ghost wavelength-dispersion image
M, M1 to M4 main point image
ME, ME15, ME16 main point image
ML, ML1 to ML4, ML11 to ML19, ML21 to ML24, ML31 main wavelength-dispersion image
IM imaging element
P optical system
Z capillary electrophoresis device

The invention claimed is:

1. An analysis device comprising:
a plurality of light emission points;
an optical system that forms images of lights emitted from the light emission points; and
a measurement unit that measures the imaged lights,
wherein a midpoint of any two light emission points among the light emission points is shifted away from an optical axis of the optical system.

2. The analysis device according to claim 1, wherein the optical axis exists outside a light emission point group consisting of the light emission points.

3. The analysis device according to claim 1, wherein when an intersection between a plane where the light emission points exist and the optical axis is set as an origin, coordinates of the light emission points are represented by vectors from the origin, and an area between two of the vectors with a maximum angle is defined, the maximum angle is smaller than 180, and then an arbitrary one of the vectors is situated within the area.

4. The analysis device according to claim 1, wherein when an intersection between a plane where the light emission points exist and the optical axis is set as an origin and coordinates of any two light emission points among the light emission points are represented by two vectors from the origin, an angle between the two vectors is approximately 0 degrees or approximately 180 degrees.

5. The analysis device according to claim 4, wherein the optical system forms images of the respective light emission points with wavelength dispersion in a direction perpendicular to the vectors.

6. The analysis device according to claim 1, wherein the light emission points are arranged in a straight line at equal intervals or in a lattice shape,
an intersection between a plane where the light emission points exist and the optical axis is set as an origin,
a first axis, which is parallel to an arbitrary straight line in which the plurality at least part of the light emission points are arranged and passes through the origin, and a second axis, which is perpendicular to the first axis and passes through the origin, are set on the plane,
an interval between the adjacent light emission points in a direction of the first axis is set as x1, and an interval between the adjacent light emission points in a direction of the second axis is set as x2, and
when a distance between a light emission point closest to the origin and the second axis is X1, and a distance between the light emission point closest to the origin and the first axis is X2,
the X1 and the X2 satisfy the following conditions: wherein there are conditions (A1) $0 \leq X1 < \frac{1}{2}*x1$, (A2) $0 \leq X2 < \frac{1}{2}*x2$, and (A3) X1 and X2 are not zero simultaneously, then, either (A1) or (A2) is satisfied and (A3) is satisfied.

7. The analysis device according to claim 6, wherein the X1 and the X2 satisfy at least one of (B1) $\frac{1}{8}*x1 \leq X1 \leq \frac{3}{8}*x1$ and (B2) $\frac{1}{8}*x2 \leq X2 \leq \frac{3}{8}*x2$.

8. The analysis device according to claim 6, wherein the X1 and the X2 satisfy at least one of (D1) $X1 \approx \frac{1}{4}*x1$ and (D2) $X2 \approx \frac{1}{4}*x2$.

9. The analysis device according to claim 1, wherein the light emission points are light emission points in a plurality of capillaries constituting a capillary array.

10. The analysis device according to claim 9, wherein the optical system forms images of the light emission points with wavelength dispersion in a major axis direction of the capillaries.

11. An analysis device comprising
an optical system that forms images of lights emitted from a light emission point group consisting of a plurality of light emission points at predetermined positions,
wherein, a midpoint of any two images among normal images of the light emission points by the optical system deviates from an optical axis of the optical system.

12. The analysis device according to claim 11, wherein the optical axis exists outside a normal image group consisting of the normal images.

13. The analysis device according to claim 11, wherein when an intersection between the optical axis and a plane where the images exist is set as an origin, coordinates of the normal images are represented by vectors on the plane, and an area between two of the vectors with a maximum angle which is smaller than 180 degrees among combinations of any two of the vectors is defined, then an arbitrary one of the vectors is situated within the area.

14. The analysis device according to claim 11, wherein when an intersection between the optical axis and a plane where the images exist is set as an origin and coordinates of any two normal images among the normal images are represented by two vectors on the plane, an angle between the two vectors is approximately 0 degrees or approximately 180 degrees.

15. The analysis device according to claim 11, wherein the optical system forms liner images of the light emission points with wavelength dispersion.

16. The analysis device according to claim 11, further comprising
a measurement unit that measures the images,
wherein an intersection between a plane where the images exist and the optical axis is set as an origin, and
a distance between a centroid position of the measurement unit optical system and an overall centroid of the normal images among the images is shorter than a distance between the origin and the overall centroid of the normal images.

17. The analysis device according to claim 2, wherein the light emission points are light emission points in a plurality of capillaries constituting a capillary array.

* * * * *